(12) United States Patent
Jiang et al.

(10) Patent No.: US 12,414,060 B2
(45) Date of Patent: *Sep. 9, 2025

(54) METHOD AND DEVICE USED IN WIRELESS COMMUNICATION NODE FOR V2X TIMING

(71) Applicant: BUNKER HILL TECHNOLOGIES LLC, Allen, TX (US)

(72) Inventors: Qi Jiang, Shanghai (CN); Xiaobo Zhang, Shanghai (CN); Zheng Liu, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,480

(22) Filed: Oct. 25, 2023

(65) Prior Publication Data

US 2024/0056995 A1   Feb. 15, 2024

Related U.S. Application Data

(63) Continuation of application No. 17/083,338, filed on Oct. 29, 2020, now Pat. No. 11,838,882, which is a
(Continued)

(30) Foreign Application Priority Data

Aug. 15, 2018 (CN) .......................... 201810929780.6

(51) Int. Cl.
*H04W 4/46* (2018.01)
*H04B 17/382* (2015.01)
(Continued)

(52) U.S. Cl.
CPC ........ *H04W 56/001* (2013.01); *H04B 17/382* (2015.01); *H04L 5/0094* (2013.01);
(Continued)

(58) Field of Classification Search
CPC ... H04L 25/247; H04L 12/43; H04L 27/2666; H04L 27/26025; H04L 1/0027;
(Continued)

(56) References Cited

U.S. PATENT DOCUMENTS 11,838,882 B2 *  12/2023  Jiang ................ H04W 72/0446
2010/0118991 A1 *  5/2010  Lee ....................... H04L 5/003
                                                                375/260
(Continued)

FOREIGN PATENT DOCUMENTS

CN          1378761 A      11/2002
CN        103379616 A      10/2013
(Continued)

OTHER PUBLICATIONS

3GPP, "TS 36.331 V14.4.0", Oct. 2017, pp. 1-761 (Year: 2017).*
(Continued)

*Primary Examiner* — Salvador E Rivas
(74) *Attorney, Agent, or Firm* — Ascenda Law Group, PC

(57) ABSTRACT

The present disclosure discloses a method and device used in wireless communication node. A first node receives first information and second information via an air interface, the first information indicating a first time offset value, and the second information indicating a first time-domain resource relative to a first instant of time; the first instant of time is associated with a first time unit. By designing the first time offset value in the present disclosure, whenever a terminal A expects a terminal B to transmit, the terminal B is able to transmit according to a timing obtained by itself and there is no need for multiple interactions between these terminals to acquire a timing advance (TA), thus improving radio signal transmission efficiency on sidelink in IOT and V2X systems and the system's overall performance.

20 Claims, 16 Drawing Sheets

Related U.S. Application Data continuation of application No. PCT/CN2019/098841, filed on Aug. 1, 2019.

(51) Int. Cl.

| | | |
|---|---|---|
| *H04L 5/00* | (2006.01) | |
| *H04L 67/104* | (2022.01) | |
| *H04W 56/00* | (2009.01) | |
| *H04W 72/0446* | (2023.01) | |
| *H04W 72/25* | (2023.01) | |
| *H04W 72/40* | (2023.01) | |
| *H04L 47/70* | (2022.01) | |
| *H04W 92/10* | (2009.01) | |

(52) U.S. Cl.
CPC ............ *H04L 67/104* (2013.01); *H04W 4/46* (2018.02); *H04W 72/0446* (2013.01); *H04W 72/25* (2023.01); *H04W 72/40* (2023.01); *H04L 5/0035* (2013.01); *H04L 47/822* (2013.01); *H04W 92/10* (2013.01)

(58) Field of Classification Search
CPC .... H04L 67/104; H04W 72/12; H04W 72/50; H04W 4/46; H04W 72/25; H04W 72/40
See application file for complete search history.

(56) References Cited

U.S. PATENT DOCUMENTS

| | | | | |
|---|---|---|---|---|
| 2011/0243111 | A1* | 10/2011 | Andgart | ................... H04L 5/00 370/338 |
| 2018/0146488 | A1* | 5/2018 | Li | ..................... H04W 72/1215 |
| 2018/0263026 | A1* | 9/2018 | Loehr | ............... H04W 72/0446 |
| 2020/0008146 | A1* | 1/2020 | Uhling | .................. H04W 72/23 |
| 2020/0029318 | A1* | 1/2020 | Guo | ....................... H04L 5/0055 |
| 2020/0120627 | A1* | 4/2020 | Xie | .................. H04W 56/0065 |
| 2020/0137769 | A1* | 4/2020 | Sun | ........................ H04L 5/0037 |
| 2022/0303059 | A1* | 9/2022 | Hahn | .................... H04L 1/1887 |

FOREIGN PATENT DOCUMENTS

| | | |
|---|---|---|
| CN | 105376849 A | 3/2016 |
| CN | 105704812 A | 6/2016 |
| CN | 106998575 A | 8/2017 |
| CN | 107040960 A | 8/2017 |
| CN | 107592327 A | 1/2018 |
| CN | 107734678 A | 2/2018 |
| KR | 101257015 B1 | 4/2013 |
| WO | 2015122027 A1 | 8/2015 |
| WO | 2017196612 A1 | 11/2017 |

OTHER PUBLICATIONS

ISR in application PCT/CN2019/098841 dated Sep. 26, 2019.
1st Office Action received in applicant No. 201810929780.6 dated Sep. 3, 2020.
Search Report received in applicant No. 201810929780.6 dated Aug. 28, 2020.
Lenovoet al. "Synchronization Mechanism in NR V2X"3GPP TSG RAN WGIMeting#94, R1-1808555, Aug. 10, 2018 (Aug. 10, 2018).
NTTDOCOMO.mpact of Coexistence between PC5-based V2V and Legacy UU3GPPTSGRAN WGIMeeting#84, R1-161051,Feb. 19, 2016(Feb. 19, 2016).
Notification to Grant Patent Right for Invention of Chinses patent application No. 201810929780.6 dated Dec. 18, 2020.

* cited by examiner

METHOD AND DEVICE USED IN WIRELESS COMMUNICATION NODE FOR V2X TIMING

CROSS REFERENCE TO RELATED APPLICATIONS

This application is a continuation of the U.S. patent application Ser. No. 17/083,338, filed on Oct. 29, 2020, which is a continuation of International Application No. PCT/CN2019/098841, filed Aug. 1, 2019, claims the priority benefit of Chinese Patent Application No. 201810929780.6, filed on Aug. 15, 2018, the full disclosure of which is incorporated herein by reference.

BACKGROUND

Technical Field

The present disclosure relates to transmission methods and devices in wireless communication systems, and in particular to a communication method and device for sidelink in wireless communications.

RELATED ART

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, the 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary meeting, the technical Study Item (SI) of NR-based V2X has already been initiated.

SUMMARY

In order to satisfy emerging traffic requirements, the NR V2X system, upgraded based on LTE V2X system, is featured with higher throughput and reliability, lower delay, more distant communications, much more precise positioning, and more variable packet size and transmission period. It also has key technical features that work more effectively with existing 3GPP and non-3GPP technologies. At present, the working mode of LTE V2X system is limited to broadcast communication. However, as a consensus drawn at the 3GPP RAN #80 Plenary, the study of NR V2X will be focused on a technical scheme supporting varied working modes, such as unicast, groupcast and broadcast; besides, it is defined in V2X that a link between a terminal and a base station is a Uu link, while a link between two terminals is a PC-5 link.

In traditional unicast communication, to ensure that uplink receptions from multiple UEs received at a base station are aligned in time domain, each UE will need to shift the uplink transmission time forward by a Timing Advance (TA) according to the start time of a downlink subframe received respectively, and the TA is what the base station estimates and sends to each UE.

Under the current LTE Device to Device (D2D)/V2X working mode, a UE transmits a broadcast radio signal through sidelink rather than transmit a radio signal targeting a specific UE. If there is large-packet traffic for a specific UE, employing the working mode of broadcast transmission will lead to lower resource utilization and hardly ensures transmission reliability; therefore, against the background of NR D2D and NR V2X, unicast transmission shall be taken into account to enhance spectrum efficiency and transmission performance, and the above problem of timing shall be reconsidered when it comes to D2D or V2X unicast transmission.

In view of the above problems, the present disclosure provides a solution to support unicast transmission. It should be noted that if no conflict is incurred, the embodiments of the UE in the present disclosure and the characteristics of the embodiments can be applied to a base station, and vice versa. And the embodiments in the present disclosure and the characteristics of the embodiments can be arbitrarily combined if there is no conflict. Further, though originally targeted at a unicast-based transmission mechanism, the present disclosure is also applicable to broadcast and groupcast transmissions; what's more, though originally targeting single-carrier communications, the present disclosure is also applicable to multicarrier communications.

In one embodiment, a transmission from a first node to a second node in the present disclosure is defined as an uplink PC-5 link, and a transmission from a second node to a first node in the present disclosure is defined as a downlink PC-5 link.

The present disclosure discloses a method in a first node for wireless communication, comprising:

receiving first information and second information via an air interface, the first information indicating a first time offset value, and the second information indicating a first time-domain resource relative to a first instant of time;

herein, the first instant of time is associated with a first time unit, the first time unit is a time unit to which a first reception time belongs after being delayed by the first time offset value, and the first reception time is associated with a time-domain resource used for receiving the first information.

In one embodiment, an advantage of the above method is that the first time-domain resource is a time-domain resource relative to the first instant of time, and the first time unit associated with the first instant of time is a time unit to which a first reception time belongs after being delayed by the first time offset value; when the first time-domain resource is used for wireless transmission of the first node, the wireless transmission of the first node is based on a reference timing of the first node itself, such as an uplink timing of a serving base station for the first node, so as to prevent the first node from advancing an uplink transmission as similar as the adjustment on a Uu interface, thus streamlining the operation between two terminals in V2X communications.

In one embodiment, another advantage of the above method is that with the first time offset value, a transmitter of the first information offsets an uplink transmission of the first node within a given time range, and receives a reception timing from the first node using a radio signal (for example, the first radio signal in the present disclosure) transmitted by the first node, so as to detect the transmission from the first node within a time range corresponding to the given time range.

In one embodiment, a third advantage is that the above method, which determines the first time-domain resource based on a reference timing of the first node itself and the first time offset value, will need not change an uplink timing between the first node and a serving base station, nor need it perform TA estimation and interaction for V2X link between V2X systems, thereby streamlining V2X communications.

In one embodiment, a fourth advantage of the above method is that the first time-domain resource is a time-domain area to receive a radio signal sent by the first node anticipated by a transmitter of the first information, since the transmitter of the first information does not force the first node to transmit any radio signal in a corresponding domain, the impact on communication between the first node and the base station will be avoided.

According to one aspect of the present disclosure, the above method is characterized in comprising:
  transmitting a first radio signal;
  herein, the first radio signal is used for determining a time-unit-level synchronous timing, and a synchronous timing of the first time unit is in conformity with the time-unit-level synchronous timing.

In one embodiment, an advantage of the above method lies in that the first radio signal is used by a transmitter of the first information for determining a first time offset value, and also for determining a timing of a downlink PC-5 link of a first node; therefore, the transmitter of the first information will ensure via through the first time offset value that a radio signal transmitted by the first node is detected in the first time-domain resource.

According to one aspect of the present disclosure, the above method is characterized in comprising:
  receiving a second radio signal; and
  transmitting a third radio signal;
  herein, a time-domain resource used for receiving the second radio signal is associated with a time-domain resource used for receiving the first information, the second information is used for determining a time-domain resource occupied by the third radio signal, and the third radio signal indicates whether the second radio signal is correctly decoded.

In one embodiment, the above method is advantageous in that the third radio signal is a HARQ-ACK on a PC-5 link, which can improve the performance of the PC-5 link.

In one embodiment, the above method is also advantageous in that each reception of the first node is based on a downlink signal on a PC-5 link of a transmitter of the first information, but after referring to the downlink timing of the PC-5 link the first node only includes the first time offset value into a transmission rather than request a TA adjustment by the first node, thus simplifying the operation of the first node; further, if the first node and the transmitter of the first information belong to different base stations and refer to different synchronous sources, the above method helps ensure all transmissions are based on a reception timing, and there is no TA operation on the PC-5 link that will cause interference with a Uu link.

According to one aspect of the present disclosure, the above method is characterized in comprising:
  transmitting a fourth radio signal;
  herein, the second information is used for determining a time-domain resource occupied by the fourth radio signal, and the time-domain resource occupied by the fourth radio signal is associated with the first time-domain resource.

In one embodiment, an advantage of the above method is that the scheme proposed by the present disclosure can be adopted by all uplink transmissions via PC-5 link of the first node, instead of being limited to the HARQ-ACK on the PC-5 link.

According to one aspect of the present disclosure, the above method is characterized in comprising:
  receiving a first signaling, the first signaling comprising the first information and the second information;
  herein, the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

In one embodiment, the above method is advantageous in that the first time offset value and the second information comprised in the first information are dynamically adjusted, thereby increasing the precision of the first time offset value and scheduling flexibility on the PC-5 link.

According to one aspect of the present disclosure, the above method is characterized in that the first time offset value is related to a subcarrier spacing employed by the second radio signal, or the first time offset value is related to a subcarrier spacing employed by a radio signal occupied by the first information.

In one embodiment, the above method is advantageous in that the first time offset value is related to a subcarrier spacing employed by a radio signal on the PC-5 link, so that the method in the present disclosure can be more flexible and adaptable to varied subcarrier spacings.

The present disclosure provides a method in a second node for wireless communication, comprising:
  transmitting first information and second information via an air interface, the first information indicating a first time offset value, and the second information indicating a first time-domain resource relative to a first instant of time;
  herein, the first instant of time is associated with a first time unit, the first time unit is a time unit to which a first reception time belongs after being delayed by the first time offset value, and the first reception time is associated with a time-domain resource used for receiving the first information.

According to one aspect of the present disclosure, the above method is characterized in comprising:
  receiving a first radio signal;
  herein, the first radio signal is used for determining a time-unit-level synchronous timing, and a synchronous timing of the first time unit is in conformity with the time-unit-level synchronous timing.

According to one aspect of the present disclosure, the above method is characterized in comprising:
  transmitting a second radio signal; and
  receiving a third radio signal;
  herein, a time-domain resource used for receiving the second radio signal is associated with a time-domain resource used for receiving the first information, the second information is used for determining a time-domain resource occupied by the third radio signal, and the third radio signal indicates whether the second radio signal is correctly decoded.

According to one aspect of the present disclosure, the above method is characterized in comprising:

receiving a fourth radio signal;

herein, the second information is used for determining a time-domain resource occupied by the fourth radio signal, and the time-domain resource occupied by the fourth radio signal is associated with the first time-domain resource.

According to one aspect of the present disclosure, the above method is characterized in comprising:

transmitting a first signaling, the first signaling comprising the first information and the second information;

herein, the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

According to one aspect of the present disclosure, the above method is characterized in that the first time offset value is related to a subcarrier spacing employed by the second radio signal, or the first time offset value is related to a subcarrier spacing employed by a radio signal occupied by the first information.

The present disclosure provides a first node for wireless communication, comprising:

a first transceiver, which receives first information and second information via an air interface, the first information indicating a first time offset value, and the second information indicating a first time-domain resource relative to a first instant of time;

herein, the first instant of time is associated with a first time unit, the first time unit is a time unit to which a first reception time belongs after being delayed by the first time offset value, and the first reception time is associated with a time-domain resource used for receiving the first information.

The present disclosure provides a second node for wireless communication, comprising:

a second transceiver, which transmits first information and second information via an air interface, the first information indicating a first time offset value, and the second information indicating a first time-domain resource relative to a first instant of time;

herein, the first instant of time is associated with a first time unit, the first time unit is a time unit to which a first reception time belongs after being delayed by the first time offset value, and the first reception time is associated with a time-domain resource used for receiving the first information.

In one embodiment, the present disclosure has the following advantages compared with prior art:

When the first time-domain resource is used for wireless transmission of the first node, the wireless transmission of the first node is performed based on a timing of its own, for instance, an uplink timing of a serving base station for the first node, so as to avoid the first node's advancing of an uplink transmission similar to an adjustment on the Uu interface, thus simplifying the operation between two terminals in V2X communications.

A transmitter of the first information offsets an uplink transmission from the first node within a given time range using the first time offset value, and then acquires a reception timing from the first node via the first radio signal, so that a wireless transmission from the first node can be detected within a given time range corresponding to the given time range.

Each reception of the first node refers to a downlink signal on a PC-5 link of a transmitter of the first information, while each transmission of the first node only includes the first time offset value based on a downlink timing on the PC-5 link rather than adjust an uplink transmission timing for the first node, thereby streamlining the first node's operation; furthermore, when the first node and the transmitter of the first information belong to different base stations and refer to different synchronous sources, the above method is employed to ensure that each transmission refers to an uplink timing of respective serving base station, and that no TA will be performed on the PC-5 link in avoidance of interference to the Uu link.

The first time-domain resource is a domain anticipated by a transmitter of the first information for receiving a radio signal from the first node, and the transmitter of the first information does not force the first node to transmit a radio signal in a corresponding domain, thus avoiding possible impact on communications between the first node and a serving base station.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
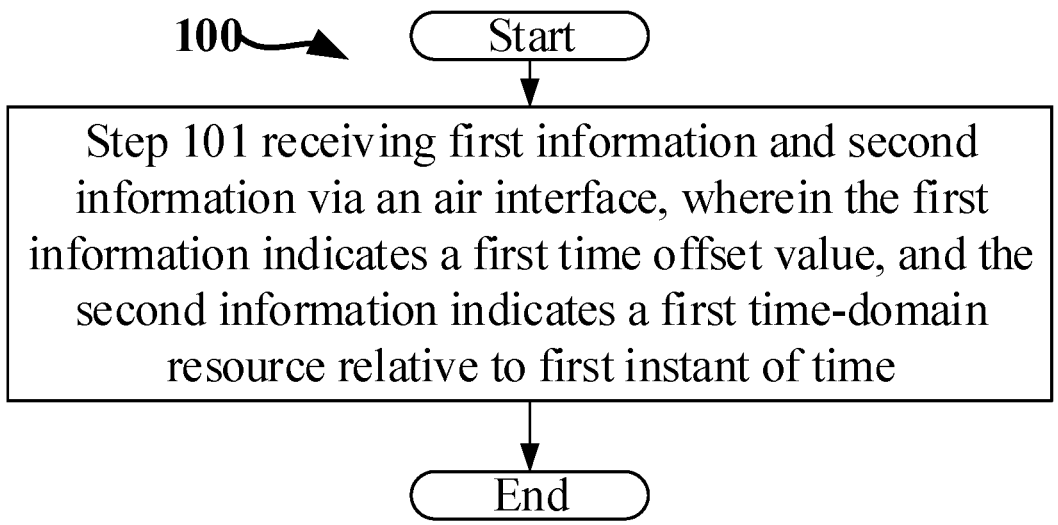
FIG. 1 illustrates a flowchart of first information and second information according to one embodiment of the present disclosure.
Figure 10:
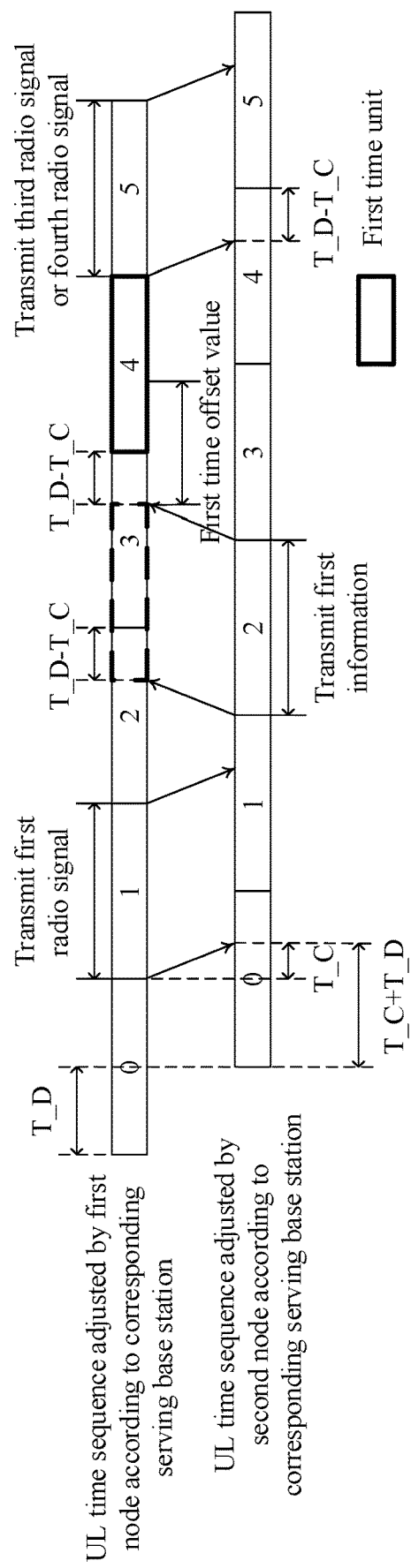
FIG. 10 illustrates a schematic diagram of a first node determining a first time offset value through a first radio signal according to one embodiment of the present disclosure.

Embodiment 1 illustrates a flowchart of first information and second information, as shown in FIG. 10. In step 100 illustrated by FIG. 1, each box represents a step.

In Embodiment 1, the first node of the present disclosure receives first information and second information via an air interface in step 101, the first information indicates a first time offset value, and the second information indicates a first time-domain resource relative to a first instant of time; the first instant of time is associated with a first time unit, the first time unit is a time unit to which a first reception time belongs after being delayed by the first time offset value, and the first reception time is associated with a time-domain resource used for receiving the first information.

In one embodiment, the first reception time is an end time for a multicarrier symbol occupied by the first information at the first node side.

In one embodiment, the first reception time is a start time for a multicarrier symbol occupied by the first information at the first node side.

In one embodiment, the first information and the second information are respectively two fields of the first signaling in the present disclosure, and the first reception time is an end time for the first node's reception of the first signaling.

In one embodiment, the first information and the second information are respectively two fields of the first signaling in the present disclosure, and the first reception time is a start time for the first node's reception of the first signaling.

In one embodiment, the first information and the second information are respectively two fields of a first signaling, and the first reception time is a start time for the first node's reception of a latest multicarrier symbol of the first signaling.

In one embodiment, the first information and the second information are respectively two fields of a first signaling, and the first reception time is a start time for the first node's reception of an earliest multicarrier symbol of the first signaling.

In one embodiment, the multicarrier symbol of the present disclosure is a Single-Carrier Frequency Division Multiple Access (SC-FDMA) symbol.

In one embodiment, the multicarrier symbol of the present disclosure is a Filter Bank Multi Carrier (FBMC) symbol.

In one embodiment, the multicarrier symbol of the present disclosure is a Cyclic Prefix (CP)-including Orthogonal Frequency Division Multiplexing (OFDM) symbol.

In one embodiment, the multicarrier symbol of the present disclosure is a CP-including Discrete Fourier Transform Spreading Orthogonal Frequency Division Multiplexing (DFT-s-OFDM) symbol.

In one embodiment, the multicarrier symbol of the present disclosure is a Discrete Fourier Transform Spreading Frequency Division Multiple Access (DFT-S-FDMA) symbol.

In one embodiment, the first instant of time is a start of the first time unit.

In one embodiment, the first instant of time is an end of the first time unit.

In one embodiment, the first instant of time is a start of a Q1-th time unit following the first time unit, Q1 being a positive integer.

In one embodiment, the first instant of time is an end of a Q1-th time unit following the first time unit, Q1 being a positive integer.

In one subembodiment of the above two embodiments, the Q1-th time unit is a slot, or the Q1-th time unit is a subframe.

In one embodiment, the phrase that the second information indicates a first time-domain resource relative to a first instant of time means that the first instant of time is a start of the first time unit, a time unit occupied by the first time-domain resource is a Q2-th time unit following the first time unit, and the second information indicates Q2, Q2 being a positive integer.

In one embodiment, the phrase that the second information indicates a first time-domain resource relative to a first instant of time means that the first instant of time is an end of the first time unit, a time unit occupied by the first time-domain resource is a Q2-th time unit following the first time unit, and the second information indicates Q2, Q2 being a positive integer.

In one embodiment, the phrase that the second information indicates a first time-domain resource relative to a first instant of time means that the first instant of time is a start of a Q1-th time unit following the first time unit, a time unit occupied by the first time-domain resource is a Q3-th time unit following the Q1-th time unit, and the second information indicates Q3, Q3 being a positive integer.

In one embodiment, the phrase that the second information indicates a first time-domain resource relative to a first instant of time means that the first instant of time is an end of a Q1-th time unit following the first time unit, a time unit occupied by the first time-domain resource is a Q3-th time unit following the Q1-th time unit, and the second information indicates Q3, Q3 being a positive integer.

In one embodiment, the Q1 in the present disclosure is fixed.

In one embodiment, the Q1 in the present disclosure is configurable.

In one embodiment, the Q1 in the present disclosure is indicated by a physical layer signaling.

In one embodiment, the Q1 in the present disclosure is indicated by the second information.

In one embodiment, the first time offset value does not exceed a duration of a time unit.

In one embodiment, the first time offset value corresponds to a positive integer number of multicarrier symbol(s).

In one embodiment, the first time offset value corresponds to a time duration of a positive integer number of multicarrier symbol(s).

In one embodiment, the first unit of the present disclosure is a slot, or the first time unit is a subframe.

In one embodiment, the first time offset value is measured by a time duration of a multicarrier symbol.

In one embodiment, the first node is a terminal.

In one embodiment, the first node is a UE.

In one embodiment, the first node is a vehicle.

In one embodiment, the time unit in the present disclosure refers to sub-frame.

In one embodiment, the time unit in the present disclosure refers to slot.

In one subembodiment, the air interface in the present disclosure corresponds to an interface between the UE 201 and the UE 241 in Embodiment 2.

In one subembodiment, the air interface in the present disclosure is carried by a wireless channel.

In one subembodiment, the air interface in the present disclosure is a wireless interface corresponding to PC-5 link.

In one embodiment, the first time unit and a time unit occupied by the first time-domain resource are spaced by a positive integer number of time unit(s).

In one embodiment, the first time unit and a time unit occupied by the first time-domain resource are continuous, and the first time unit is a time unit behind the time unit occupied by the first time-domain resource.

In one embodiment, the first reception time is included in a time unit at the first node side.

In one embodiment, the first reception time is not a start time of any time unit at the first node side, nor is the first reception time an end time of any time unit at the first node side.

Embodiment 2

Figure 2:
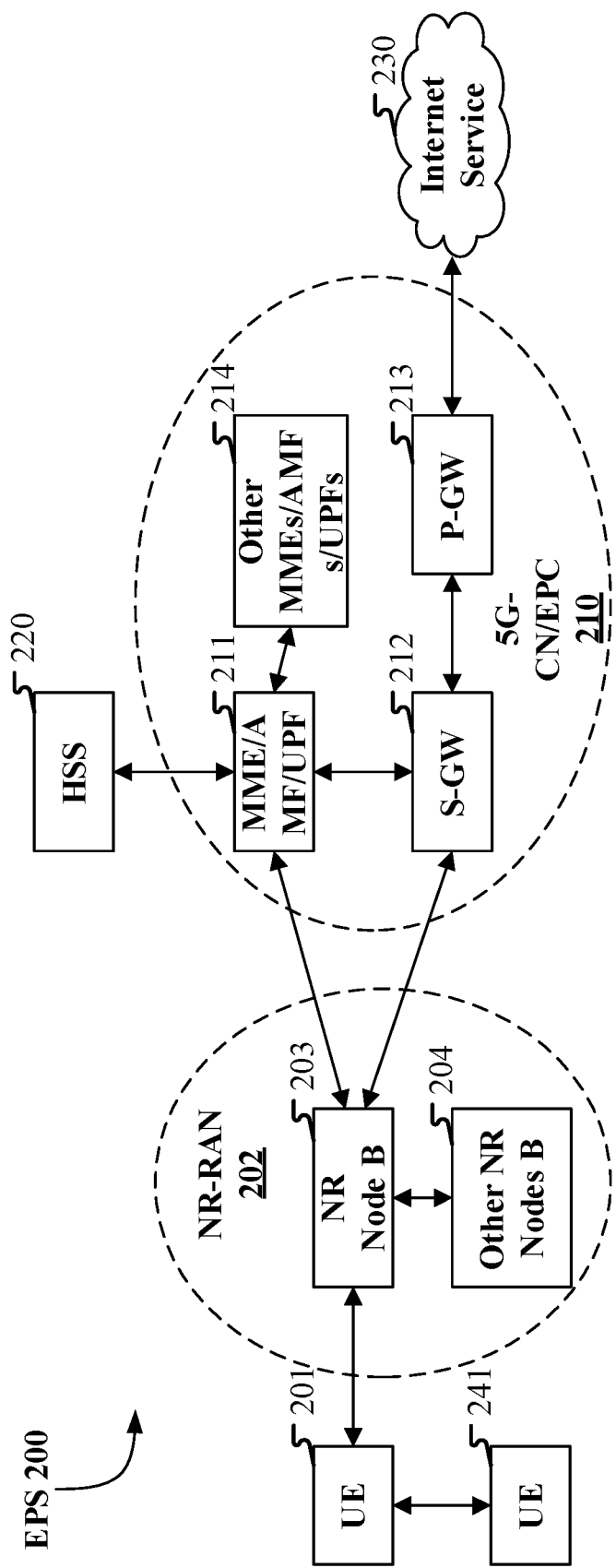
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or some other appropriate terminology, which may comprise one or more UEs 201, a UE 241 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S 1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node of the present disclosure.

In one embodiment, the UE 241 corresponds to the second node of the present disclosure.

In one embodiment, the first node of the present disclosure is the UE 201, while the second node of the present disclosure is a terminal within the coverage of the gNB203.

In one embodiment, the first node of the present disclosure is the UE 201, while the second node of the present disclosure is a terminal out of the coverage of the gNB203.

In one embodiment, the first node and the second node of the present disclosure are both served by the gNB203.

In one embodiment, the UE 201 supports simultaneous transmissions on multiple Component Carriers (CCs).

In one embodiment, the UE 201 supports simultaneous transmissions on multiple Bandwidth Parts (BWPs).

In one embodiment, the UE 241 supports simultaneous transmissions on multiple CCs.

In one embodiment, the UE 241 supports simultaneous transmissions on multiple BWPs.

In one embodiment, the gNB203 supports simultaneous transmissions on multiple CCs.

In one embodiment, the gNB203 supports simultaneous transmissions on multiple BWPs.

In one embodiment, a radio link between the UE 201 and the UE 241 corresponds to the PC-5 link in the present disclosure.

In one embodiment, a radio link between the UE 201 and the UE 241 corresponds to the PC-5 uplink in the present disclosure.

In one embodiment, a radio link between the UE 241 and the UE 201 corresponds to the PC-5 downlink in the present disclosure.

In one embodiment, a radio link between the UE 201 and the NR node B corresponds to the Uu link in the present disclosure.

Embodiment 3

Figure 3:
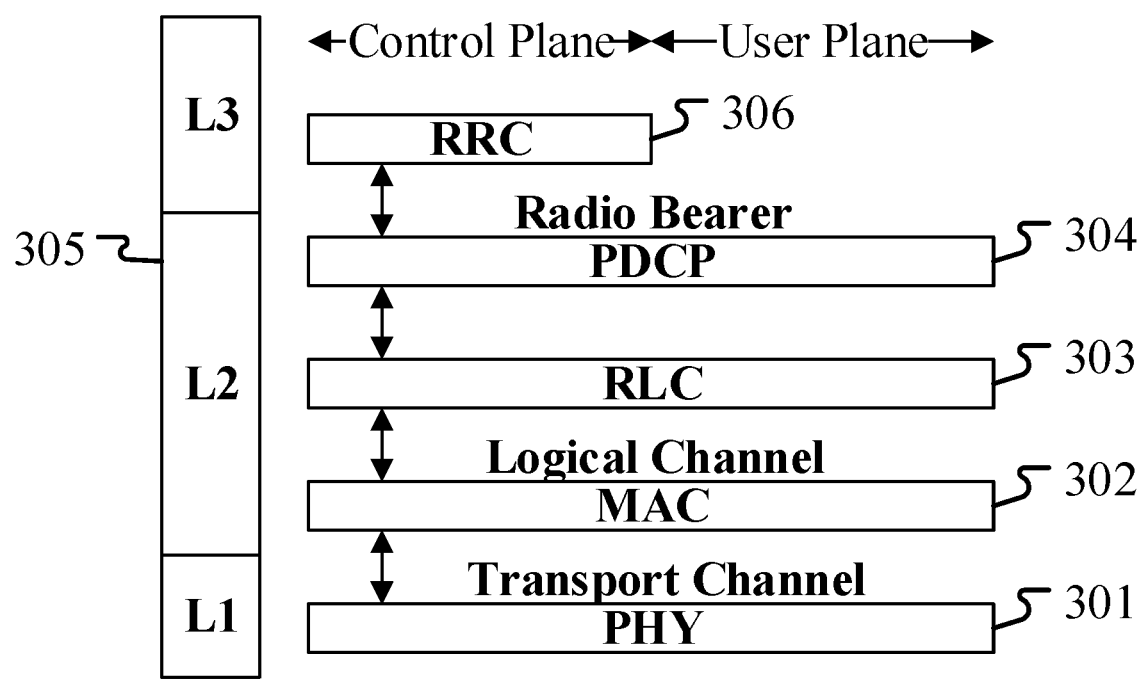
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher-layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNB s. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the base station in the present disclosure.

In one embodiment, the first information of the present disclosure is generated by the PHY 301.

In one embodiment, the second information of the present disclosure is generated by the PHY 301.

In one embodiment, the first signaling of the present disclosure is generated by the PHY 301.

In one embodiment, the first radio signal of the present disclosure is generated by the PHY 301.

In one embodiment, the second radio signal of the present disclosure is generated by the MAC sublayer 302.

In one embodiment, the third radio signal of the present disclosure is generated by the MAC sublayer 302.

In one embodiment, the fourth radio signal of the present disclosure is generated by the MAC sublayer 302.

Embodiment 4

Figure 4:
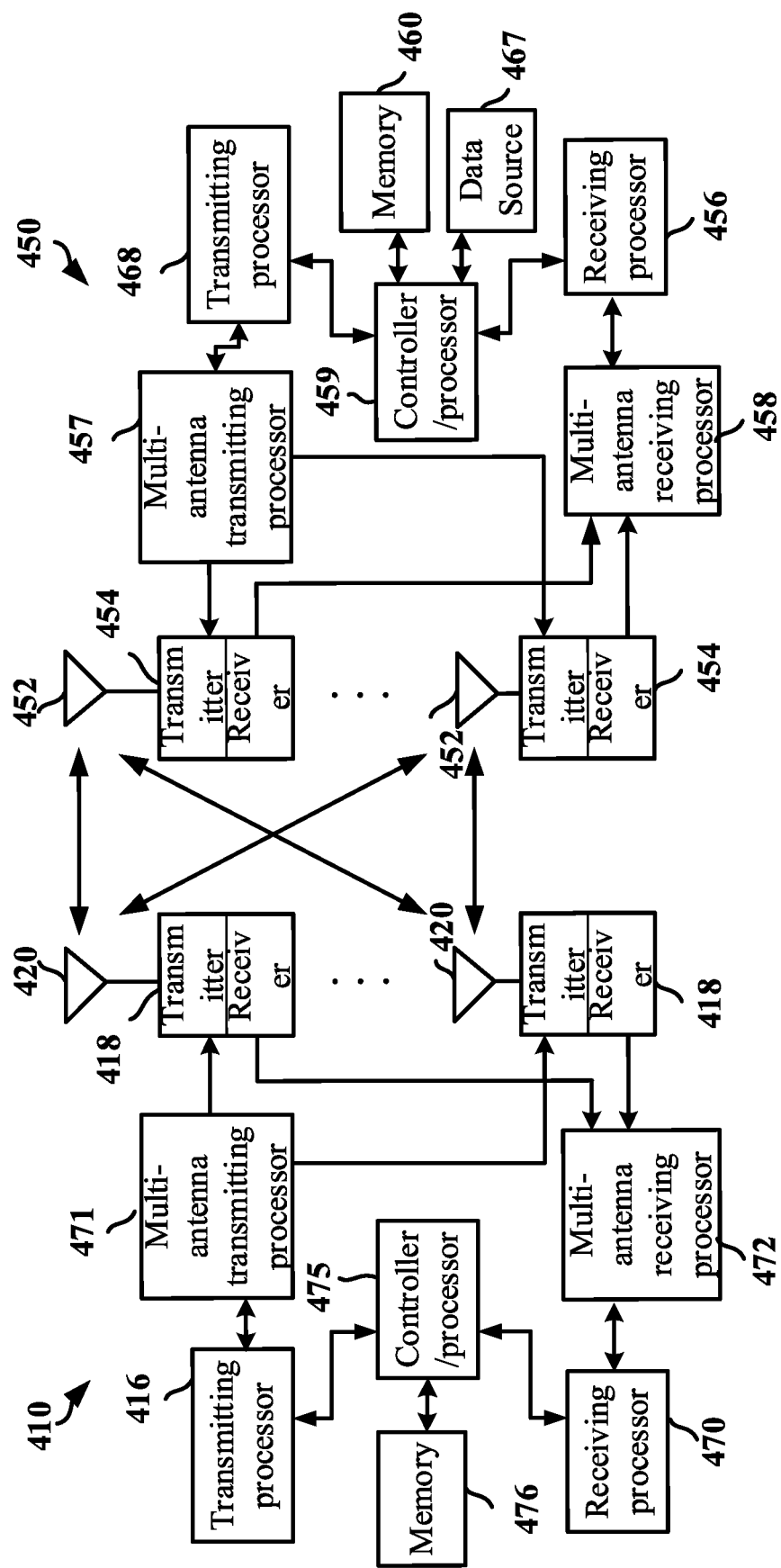
FIG. 4 illustrates a schematic diagram of a first communication node and a second communication node according to one embodiment of the present disclosure.

Embodiment 4 illustrates a schematic diagram of a first communication node and a second communication node, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

In a transmission from the second communication device 410 to the first communication device 450, at the second communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the first communication device 450 and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the second communication device 410 and the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the first communication device 450 and the second communication device 410, the controller/processor 475 provides de-multiplexing between a transport channel and a logical channel, packet reassembling, decrypting, header decompression, control signal processing so as to recover a higher-layer packet from the first communication device 450 (UE450). The higher-layer packet coming from the controller/processor 475 may be provided to the core network.

In one embodiment, the first communication device 450 comprises at least one processor and at least one memory. The at least one memory includes computer program codes. The at least one memory and the computer program codes are configured to be used in collaboration with the at least one processor. The first communication device 450 at least receives first information and second information via an air interface, the first information indicating a first time offset value, and the second information indicating a first time-domain resource relative to a first instant of time; the first instant of time is associated with a first time unit, the first time unit is a time unit to which a first reception time belongs after being delayed by the first time offset value, and the first reception time is associated with a time-domain resource used for receiving the first information.

In one embodiment, the first communication device 450 comprises a memory that stores a computer readable instruction program. The computer readable instruction program generates an action when executed by at least one processor, which includes: receiving first information and second information via an air interface, the first information indicating a first time offset value, and the second information indicating a first time-domain resource relative to a first instant of time; the first instant of time is associated with a first time unit, the first time unit is a time unit to which a first reception time belongs after being delayed by the first time offset value, and the first reception time is associated with a time-domain resource used for receiving the first information.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits first information and second information via an air interface, the first information indicating a first time offset value, and the second information indicating a first time-domain resource relative to a first instant of time; the first instant of time is associated with a first time unit, the first time unit is a time unit to which a first reception time belongs after being delayed by the first time offset value, and the first reception time is associated with a time-domain resource used for receiving the first information.

In one embodiment, the second communication device 410 comprises a memory that stores a computer readable instruction program. The computer readable instruction program generates an action when executed by at least one processor, which includes: transmitting first information and second information via an air interface, the first information indicating a first time offset value, and the second information indicating a first time-domain resource relative to a first instant of time; the first instant of time is associated with a first time unit, the first time unit is a time unit to which a first reception time belongs after being delayed by the first time offset value, and the first reception time is associated with a time-domain resource used for receiving the first information.

In one embodiment, the first communication device 450 corresponds to the first node of the present disclosure.

In one embodiment, the second communication device 410 corresponds to the second node of the present disclosure.

In one embodiment, at least one of the antenna 452, the receiver 454, the multi-antenna receiving processor 458 or the receiving processor 456 is used to receive the first information and the second information of the present disclosure via an air interface, wherein the first information indicates a first time offset value, while the second information indicates a first time-domain resource relative to a first instant of time; at least one of the antenna 420, the transmitter 418, the multi-antenna transmitting processor 471 or the transmitting processor 416 is used to transmit the first information and the second information of the present disclosure via an air interface, wherein the first information indicates a first time offset value, while the second information indicates a first time-domain resource relative to a first instant of time.

In one embodiment, at least one of the antenna 452, the transmitter 454, the multi-antenna transmitting processor 457 or the transmitting processor 468 is used to transmit the first radio signal of the present disclosure; at least one of the antenna 420, the receiver 418, the multi-antenna receiving processor 472 or the receiving processor 470 is used to receive the first radio signal of the present disclosure.

In one embodiment, at least one of the antenna 452, the receiver 454, the multi-antenna receiving processor 458 or the receiving processor 456 is used to receive the second radio signal of the present disclosure; at least one of the antenna 420, the transmitter 418, the multi-antenna transmitting processor 471 or the transmitting processor 416 is used to transmit the second radio signal of the present disclosure.

In one embodiment, at least one of the antenna 452, the transmitter 454, the multi-antenna transmitting processor 457 or the transmitting processor 468 is used to transmit the third radio signal of the present disclosure; at least one of the antenna 420, the receiver 418, the multi-antenna receiving processor 472 or the receiving processor 470 is used to receive the third radio signal of the present disclosure.

In one embodiment, at least one of the antenna 452, the transmitter 454, the multi-antenna transmitting processor 457 or the transmitting processor 468 is used to transmit the fourth radio signal of the present disclosure; at least one of the antenna 420, the receiver 418, the multi-antenna receiving processor 472 or the receiving processor 470 is used to receive the fourth radio signal of the present disclosure.

In one embodiment, at least one of the antenna 452, the receiver 454, the multi-antenna receiving processor 458 or the receiving processor 456 is used to receive the first signaling of the present disclosure; at least one of the antenna 420, the transmitter 418, the multi-antenna transmitting processor 471 or the transmitting processor 416 is used to transmit the first signaling of the present disclosure.

Embodiment 5

Figure 5:
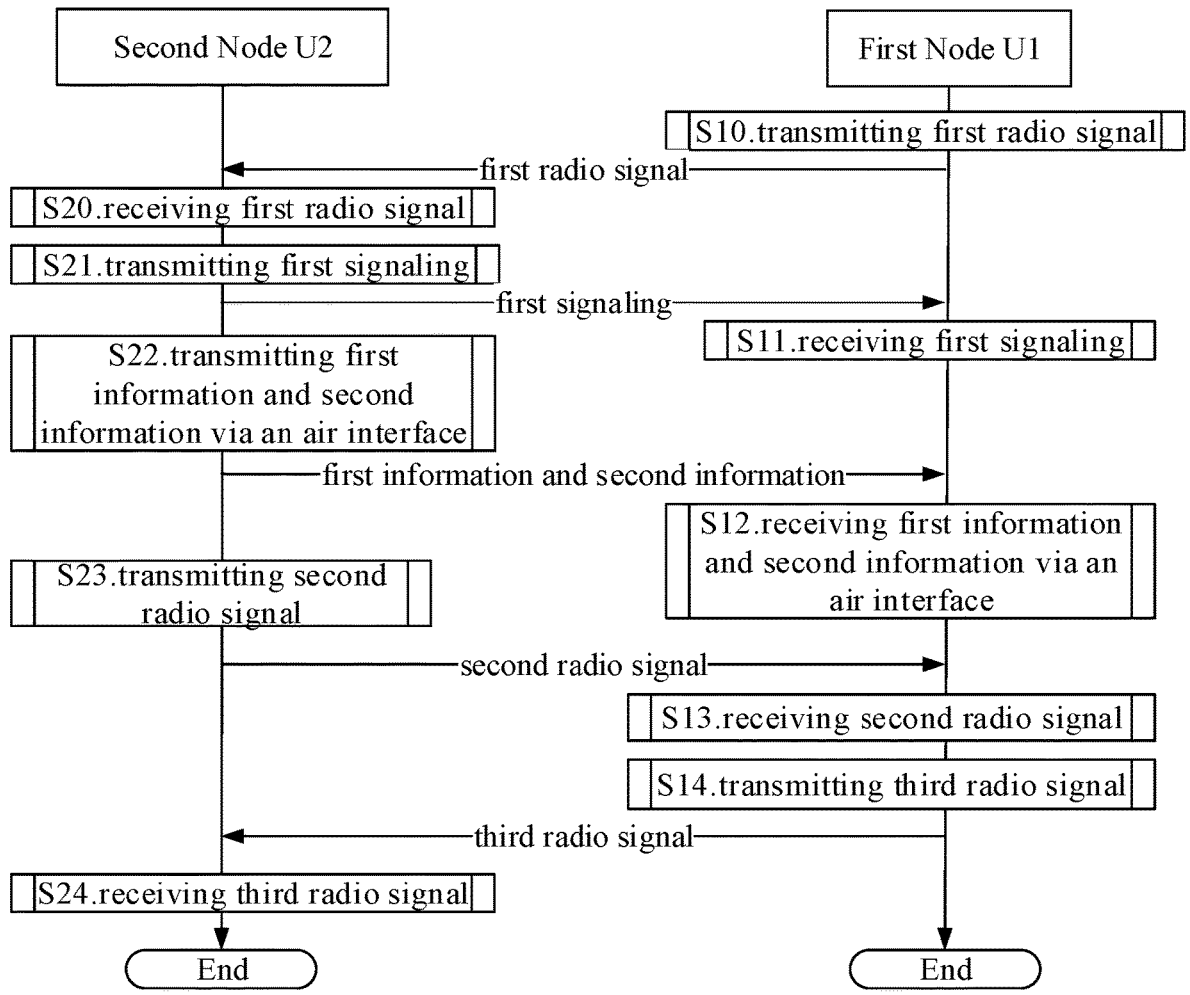
FIG. 5 illustrates a flowchart of a first radio signal according to one embodiment of the present disclosure.

Embodiment 5 illustrates a flowchart of a first radio signal, as show in FIG. 5. In FIG. 5, a first node U1 and a second node U2 are in communication via sidelink; if no conflict is incurred, embodiments and subembodiments in Embodiment 5 can be applied to Embodiment 6.

The first node U1 transmits a first radio signal in step S10; receives a first signaling in step S11; and receives first information and second information in step S12; receives a second radio signal in step S13; and transmits a third radio signal in step S14.

The second node U2 receives a first radio signal in step S20; transmits a first signaling in step S21; and transmits first information and second information in step S22; transmits a second radio signal in step S23; and receives a third radio signal in step S24.

In Embodiment 5, the first instant of time is associated with a first time unit, the first time unit is a time unit to which a first reception time belongs after being delayed by the first time offset value, and the first reception time is associated with a time-domain resource used for receiving the first information; the first radio signal is used for determining a time-unit-level synchronous timing, and a synchronous timing of the first time unit is in conformity with the time-unit-level synchronous timing; a time-domain resource used for receiving the second radio signal is associated with a time-domain resource used for receiving the first information, the second information is used for determining a time-domain resource occupied by the third radio signal, and the third radio signal indicates whether the second radio signal is correctly decoded; the first signaling comprises configuration information of the second radio signal, the configuration information of the second radio signal comprising the time-domain resource used for receiving the second radio signal.

In one embodiment, the first radio signal comprises a Discovery Reference Signal (DRS).

In one embodiment, the first radio signal is transmitted on a Physical Sidelink Discovery Channel (PSDCH).

In one embodiment, the first radio signal comprises at least one of a Primary Sidelink Synchronization Signal (PSSS) or a Secondary Sidelink Synchronization Signal (SSSS).

In one embodiment, the first radio signal is transmitted on a Physical Sidelink Broadcasting Channel (PSBCH).

In one embodiment, the first radio signal is broadcast.

In one embodiment, for the first node U1, a start time for the first time unit is determined according to a transmission timing of the first node U1.

In one embodiment, for the second node U2, a start time for the first time unit is determined according to a transmission timing of the first node U1.

In one embodiment, the phrase that the first radio signal is used for determining a time-unit-level synchronous timing comprises: a receiver of the first radio signal includes a second node U2, the second node U2 determines a timeunit-level synchronous timing of a link from the first node U1 to the second node U2 via the first radio signal.

In one embodiment, the phrase that a synchronous timing of the first time unit is in conformity with the time-unit-level synchronous timing comprises: the first time unit is determined according to the time-unit-level synchronous timing determined by the first radio signal.

In one embodiment, the phrase that a synchronous timing of the first time unit is in conformity with the time-unit-level synchronous timing comprises: the second node U2 determines the first time unit according to the time-unit-level synchronous timing obtained by the first radio signal.

In one embodiment, the second node U2 determines the first time offset value through the first radio signal.

In one embodiment, the second node U2 estimates the first time offset value through the first radio signal.

In one subembodiment of the above embodiment, the first time offset value is related to a transmission delay between the first node U1 and the second node U2.

In one subembodiment of the above embodiment, the first time offset value is related to a timing difference between the first node U1 and the second node U2.

In one embodiment, the third radio signal is Hybrid Automatic Repeat reQuest Acknowledgment (HARQ-ACK) for the second radio signal.

In one embodiment, the phrase that a time-domain resource used for receiving the second radio signal is associated with a time-domain resource used for receiving the first information comprises: a time unit occupied by the second radio signal is the same as a time unit occupied by the first information.

In one embodiment, the phrase that a time-domain resource used for receiving the second radio signal is associated with a time-domain resource used for receiving the first information comprises: a time unit to which an earliest multicarrier symbol occupied by the second radio signal belongs is the same as a time unit to which an earliest multicarrier symbol occupied by the first information belongs.

In one embodiment, the phrase that a time-domain resource used for receiving the second radio signal is associated with a time-domain resource used for receiving the first information comprises: a time unit to which a latest multicarrier symbol occupied by the second radio signal belongs is the same as a time unit to which a latest multicarrier symbol occupied by the first information belongs.

In one embodiment, the phrase that a time-domain resource used for receiving the second radio signal is associated with a time-domain resource used for receiving the first information comprises: a time unit occupied by the second radio signal is a P-th time unit following a time unit occupied by the first information, P being a positive integer; the P is fixed, or the P is indicated by a dynamic signaling.

In one embodiment, the phrase that a time-domain resource used for receiving the second radio signal is associated with a time-domain resource used for receiving the first information comprises: a time unit to which an earliest multicarrier symbol occupied by the second radio signal belongs is a P-th time unit following a time unit to which an earliest multicarrier symbol occupied by the first information belongs, P being a positive integer; the P is fixed, or the P is indicated by a dynamic signaling.

In one embodiment, the phrase that a time-domain resource used for receiving the second radio signal is associated with a time-domain resource used for receiving the first information comprises: a time unit to which a latest multicarrier symbol occupied by the second radio signal belongs is a P-th time unit following a time unit to which a latest multicarrier symbol occupied by the first information belongs, P being a positive integer; the P is fixed, or the P is indicated by a dynamic signaling.

In one embodiment, how to determine a time-domain resource occupied by the third radio signal is implementation dependent, which means that there is no need for standardization.

In one embodiment, the first node U1 self-determines a time-domain resource occupied by the third radio signal according to the second information.

In one embodiment, the phrase that the second information is used for determining a time-domain resource occupied by the third radio signal comprises: the first node U1 schedules the time-domain resource occupied by the third radio signal to be part of the first time-domain resource to the best of its capacity.

In one embodiment, the phrase that the second information is used for determining a time-domain resource occupied by the third radio signal comprises: the first node U1 tries to transmit the third radio signal in the first time-domain resource to the best of its capacity.

In one embodiment, the phrase that the second information is used for determining a time-domain resource occupied by the third radio signal comprises: the time-domain resource occupied by the third radio signal belongs to the first time-domain resource given that no conflict is incurred with other scheduling.

In one subembodiment, the other scheduling is from a base station.

In one subembodiment, the other scheduling is from a cellular network.

In one embodiment, the phrase that the second information is used for determining a time-domain resource occupied by the third radio signal comprises: the time-domain resource occupied by the third radio signal belongs to the first time domain resource given that the first time-domain resource is idle.

In one embodiment, a start time for a time unit occupied by the second radio signal in time domain is the first instant of time.

In one embodiment, an end time for a time unit occupied by the second radio signal in time domain is the first instant of time.

In one embodiment, the second radio signal is transmitted on a Physical Sidelink Shared Channel (PSSCH).

In one embodiment, the third radio signal is transmitted on a PSSCH.

In one embodiment, the third radio signal is transmitted on a Physical Sidelink Control Channel (PSCCH).

In one embodiment, the first time-domain resource comprises K1 sub-time-domain resources, and the time-domain resource occupied by the third radio signal is one of the K1 sub-time-domain resources, K1 being a positive integer greater than 1.

In one embodiment, the time-domain resource occupied by the third radio signal is the first time-domain resource.

In one embodiment, the first signaling comprises configuration information of the second radio signal, and the configuration information of the second radio signal comprises the time-domain resource used for receiving the second radio signal.

In one embodiment, the first signaling is a physical layer signaling.

In one embodiment, the first signaling is Sidelink Control Information (SCI).

In one embodiment, the first signaling occupies a PSCCH.

In one embodiment, the first signaling is used for scheduling the second radio signal.

In one embodiment, the first signaling also comprises at least one of Frequency Hopping Flag, Resource Block Assignment and Hopping Resource Allocation, Time Resource Pattern, a Modulation and Coding Scheme (MCS), Timing Advance Indication or a Group Destination ID.

In one embodiment, the first signaling also comprises at least one of Priority, Resource Reservation, Frequency Resource Location of Initial Transmission and Retransmission, Time Gap Between Initial Transmission and Retransmission, an MCS or a Retransmission Index.

In one embodiment, the first time offset value is related to a subcarrier spacing employed by the second radio signal.

In one embodiment, the first time offset value is related to a subcarrier spacing employed by a radio signal occupied by the first information.

In one embodiment, the first time offset value is related to a subcarrier spacing employed by first signaling.

In one embodiment, the phrase that the first time offset value is related to a subcarrier spacing employed by a given radio signal means that the first time offset value is equal to a time duration of M multicarrier symbols in time domain, and a subcarrier spacing employed by any of the M multicarrier symbols is the same as a subcarrier spacing employed by the given radio signal; the given radio signal is the second radio signal, or the given radio signal is a radio signal occupied by the first information, or the given radio signal is the first signaling.

In one embodiment, the second node U2 determines whether the third radio signal is transmitted through detecting of a Demodulation Reference Signal (DMRS).

In one embodiment, the second node U2 determines whether the third radio signal is transmitted according to Cyclic Redundancy Check (CRC).

Embodiment 6

Figure 6:
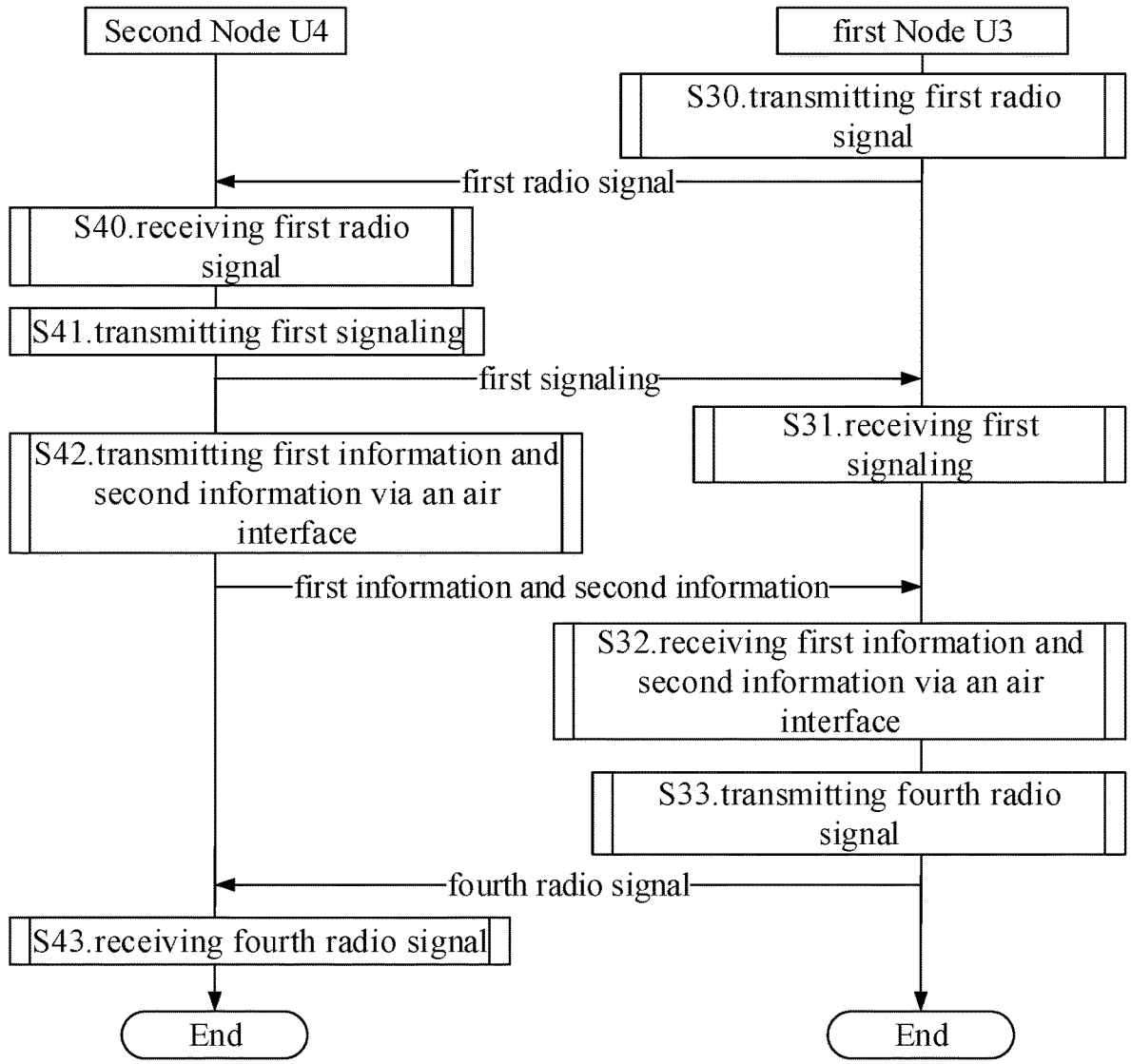
FIG. 6 illustrates a flowchart of a fourth radio signal according to one embodiment of the present disclosure.

Embodiment 6 illustrates a flowchart of a fourth radio signal, as shown in FIG. 6. In FIG. 6, a first node U3 and a second node U4 are in communication via sidelink; if no conflict is incurred, embodiments and subembodiments in Embodiment 6 can be applied to Embodiment 5.

The first node U3 transmits a first radio signal in step S30; receives a first signaling in step S31; receives first information and second information via an air interface in step S32; and transmits a fourth radio signal in step S33.

The second node U4 receives a first radio signal in step S40; transmits a first signaling in step S41; transmits first information and second information via an air interface in step S42; and receives a fourth radio signal in step S34.

In Embodiment 6, the first instant of time is associated with a first time unit, the first time unit is a time unit to which a first reception time belongs after being delayed by the first time offset value, and the first reception time is associated with a time-domain resource used for receiving the first information; the first radio signal is used for determining a time-unit-level synchronous timing, and a synchronous timing of the first time unit is in conformity with the time-unit-level synchronous timing; the second information is used for determining a time-domain resource occupied by the fourth radio signal, and the time-domain resource occupied by the fourth radio signal is associated with the first time-domain resource; the first signaling comprises configuration information of the fourth radio signal, the configuration information of the fourth radio signal comprising a time-domain resource used for transmitting the fourth radio signal.

In one embodiment, the phrase that the second information is used for determining a time-domain resource occupied by the fourth radio signal comprises: the second node U4 schedules the time-domain resource occupied by the fourth radio signal to be part of the first time-domain resource.

In one embodiment, the phrase that the second information is used for determining a time-domain resource occupied by the fourth radio signal comprises: the first node U3 tries to transmit the fourth radio signal in the first time-domain resource to the best of its capacity.

In one embodiment, the phrase that the second information is used for determining a time-domain resource occupied by the fourth radio signal comprises: the time-domain resource occupied by the fourth radio signal belongs to the first time-domain resource given that no conflict is incurred with other scheduling.

In one subembodiment, the other scheduling is from a base station.

In one subembodiment, the other scheduling is from a cellular network.

In one embodiment, the phrase that the second information is used for determining a time-domain resource occupied by the fourth radio signal comprises: the time-domain resource occupied by the fourth radio signal belongs to the first time-domain resource given that the first time-domain resource is idle.

In one embodiment, the phrase that the time-domain resource occupied by the fourth radio signal is associated with the first time-domain resource comprises: the first time-domain resource comprises K1 sub-time-domain resources, and the time-domain resource occupied by the fourth radio signal is one of the K1 sub-time-domain resources, K1 being a positive integer greater than 1.

In one embodiment, the phrase that the time-domain resource occupied by the fourth radio signal is associated with the first time-domain resource comprises: the time-domain resource occupied by the fourth radio signal is the first time-domain resource.

In one embodiment, the phrase that the time-domain resource occupied by the fourth radio signal is associated with the first time-domain resource comprises: the time-domain resource occupied by the fourth radio signal belongs to the first time-domain resource.

In one embodiment, the fourth radio signal is transmitted on a PSSCH.

In one embodiment, the fourth radio signal comprises Channel State Information (CSI) of a radio link between the second node U4 and the first node U3.

In one embodiment, the first signaling comprises configuration information of the fourth radio signal, and the configuration information of the fourth radio signal comprises the time-domain resource used for transmitting the fourth radio signal.

In one embodiment, the first signaling is used for scheduling the fourth radio signal.

In one embodiment, the first signaling schedules the first node U3 to transmit the fourth radio signal to the second node U4.

In one embodiment, the second node U4 determines whether the fourth radio signal is transmitted through detecting of a Demodulation Reference Signal (DMRS).

In one embodiment, the second node U4 determines whether the fourth radio signal is transmitted according to Cyclic Redundancy Check (CRC).

Embodiment 7

Figure 7:
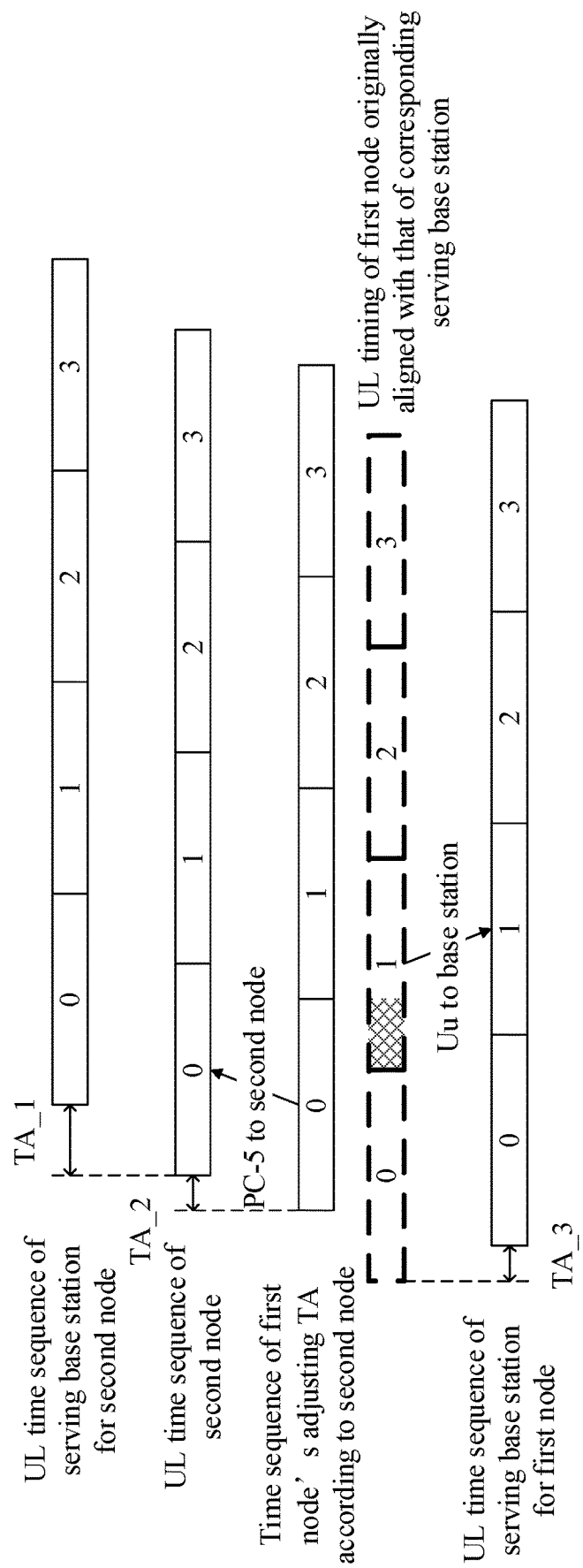
FIG. 7 illustrates a sequence diagram of a first node and a second node designed by adopting a traditional method of Timing Advance according to one embodiment of the present disclosure.

Embodiment 7 illustrates a sequence diagram of a first node and a second node designed by adopting a traditional method of Timing Advance, as shown in FIG. 7. In FIG. 7, each rectangle represents a slot, in which each number represents a slot number; the second node sends to the first node a TA to adjust a start time for uplink transmission of the first node on a PC-5 link. The above method ensures that radio signals transmitted from different terminals that are received by the second node are aligned at the second node, however, the first node and the second node do not necessarily belong to a same serving base station, as a result, as long as the first node tries to maintain its uplink synchronization with a serving base station for the first node, the above method will lead to collisions of Uu link and PC-5 link of the first node.

Specifically, as shown in FIG. 7, TA_1 is a Timing Advance (TA) introduced by the second node to ensure uplink synchronization with a serving base station for the second node; TA_2 is a TA introduced by the second node to ensure that an uplink radio signal on a PC-5 link transmitted by the first node and the second node's own uplink timing are brought to alignment; TA_3 is a Timing Advance (TA) originally introduced by the first node with a view to guaranteeing uplink synchronization with a serving base station for the first node. The dotted box represents an uplink timing of the first node originally needed to be aligned with that of a serving base station for the first node. As illustrated by FIG. 7, since the first node needs to adjust TA_2 targeting the second node, when the first node transmits a radio signal on PC-5 link to the second node in slot #0 and transmits a radio signal on Uu link to the serving base station in slot #1, the afore-mentioned method of TA will cause collision of cross-filled part of the slot.

Embodiment 8

Figure 8:
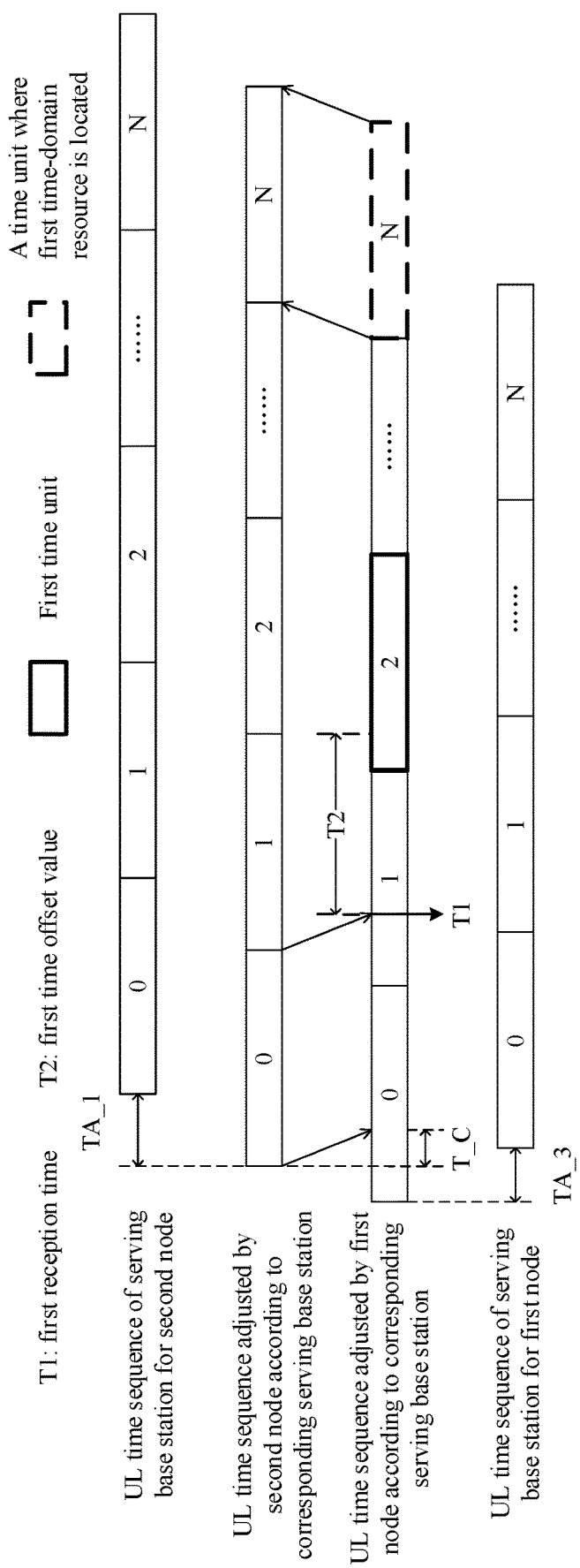
FIG. 8 illustrates a sequence diagram of a first node and a second node designed by adopting a first time offset value according to one embodiment of the present disclosure.

Embodiment 8 illustrates a sequence diagram of a first node and a second node designed by adopting a first time offset value, as shown in FIG. 8. In FIG. 8, each rectangle represents a time unit, in which each number represents a slot number; TA_1 is a TA between a second node and a serving base station for the second node, TA_3 is a TA between a first node and a serving base station for the first node, and T_C is a transmission delay from a second node to a first node. the second node transmits first information in time unit #0, the first node completes reception of a radio signal corresponding to first information at an instant of time T1 illustrated by FIG. 9, a time unit to which T1 belongs after being delayed by T2 is the first time unit in the present disclosure, and then the first node determines that time unit #N behind the time unit #2, as indicated by the second information, is a time unit where the first time-domain resource is located.

In one embodiment, the first information, the second information and the second radio signal are transmitted by the first node in the time unit #0 illustrated by FIG. 8.

In one embodiment, the second information indicates a number of time unit(s) between time unit #N and time unit #2.

In one embodiment, the second information indicates (N−2), and the (N−2) represents that a time unit where the first time-domain resource is located is the (N−2)-th time unit following the first time unit.

Embodiment 9

Figure 9:
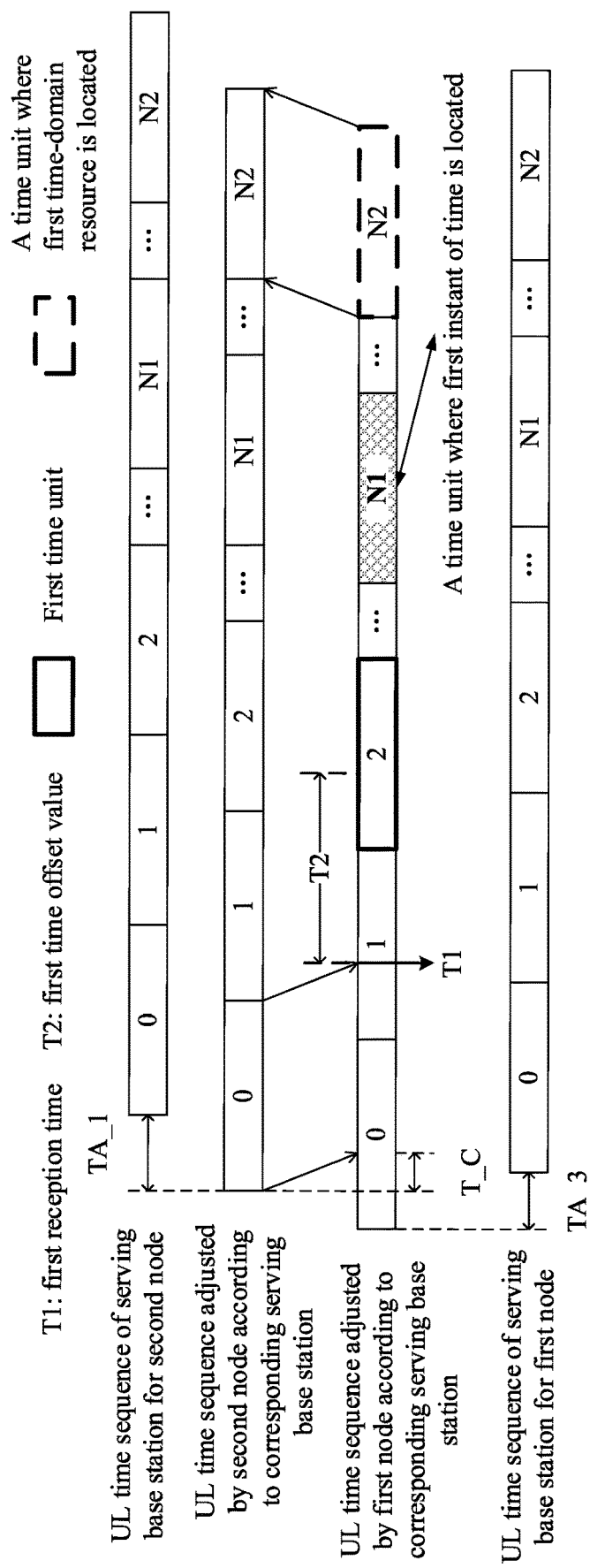
FIG. 9 illustrates a sequence diagram of a first node and a second node designed by adopting a first time offset value according to another embodiment of the present disclosure.

Embodiment 9 illustrates another sequence diagram of a first node and a second node designed by adopting a first time offset value, as shown in FIG. 9. In FIG. 9, each rectangle represents a time unit, in which each number represents a slot number; TA_1 is a TA between a second node and a serving base station for the second node, TA_3 is a TA between a first node and a serving base station for the first node, and T_C is a transmission delay from a second node to a first node. The first node and the second node in FIG. 9 respectively adjust uplink timings corresponding to respective serving base stations; the second node transmits first information in time unit #0, the first node completes reception of a radio signal corresponding to first information at an instant of time T1 illustrated by FIG. 9, a time unit to which T1 belongs after being delayed by T2 is the first time unit in the present disclosure, and time unit #N1 corresponds to a time unit where the first instant of time is located in the present disclosure, and then the first node determines that time unit #N2 behind the time unit #N1, as indicated by the second information, is a time unit where the first time-domain resource is located.

In one embodiment, the first information and the second information are transmitted by the first node in the time unit #0 illustrated by FIG. 9, while the second radio signal is transmitted in the time unit #N1.

In one embodiment, the second information indicates a number of time unit(s) between the time unit #N2 and the time unit #N1.

In one embodiment, the second information indicates (N2−N1), and the (N2−N1) represents that a time unit where the first time-domain resource is located is the (N2−N1)-th time unit following the first time unit.

In one embodiment, the second information also indicates the (N1−2).

In one embodiment, the (N1−2) has a fixed value, or the value of the (N1−2) is configured by a higher-layer signaling.

Embodiment 10

Embodiment 10 illustrates a schematic diagram of a first node determining a first time offset value through a first radio signal, as shown in FIG. 10. In FIG. 10, the first node and the second node respectively following uplink timings of corresponding serving base stations lead to the result that a timing difference between the first node and the second node is T_D; the first node transmits a first radio signal to the second node, a transmission delay between the first node and the second node is T_C, and the second node is aware of a sequence number of a time unit in which the first node transmits the first radio signal referring to the timing of the serving base station for the first node; it is assumed in FIG. 10 that the first radio signal is transmitted in time unit #1 under the timing taken by the first node as reference, and that the second node transmits the first information of the present disclosure to the first node in time unit #2 under the timing taken by the second node as reference.

As shown in FIG. 10, a first node may estimate a value of (T_D+T_C) according to the first radio signal; in terms of a second node, once a second node receives first information in the thick dotted-lined box, the second node just needs to further delay the reception time of the first information by at least (T_D−T_C) to ensure that a delayed instant of time lies in time unit #4, then the first node determines a first time-domain resource referring to the time unit #4; for instance, the first node in FIG. 10 transmits the third radio signal or the fourth radio signal of the present disclosure to the second node in time unit #5, while the second node only needs to start detecting the third radio signal or the fourth radio signal at an instant of time when the time unit #5 is translated forward by (T_D−T_C).

Considering that V2X communication is always short, a value of T_C is generally not too much larger than T_D, therefore, as soon as the second node estimates a value of (T_D+T_C), a value of (T_D−T_C) can be determined based on the value of (T_D+T_C). Besides, (T_D−T_C) is a minimum value of the first time offset value, so the first node can ensure by indicating the first time offset value that a location of the first node's wireless transmission to the second node by referring to UL synchronization of a serving cell of the first node is predictable.

Embodiment 11

Figure 11:
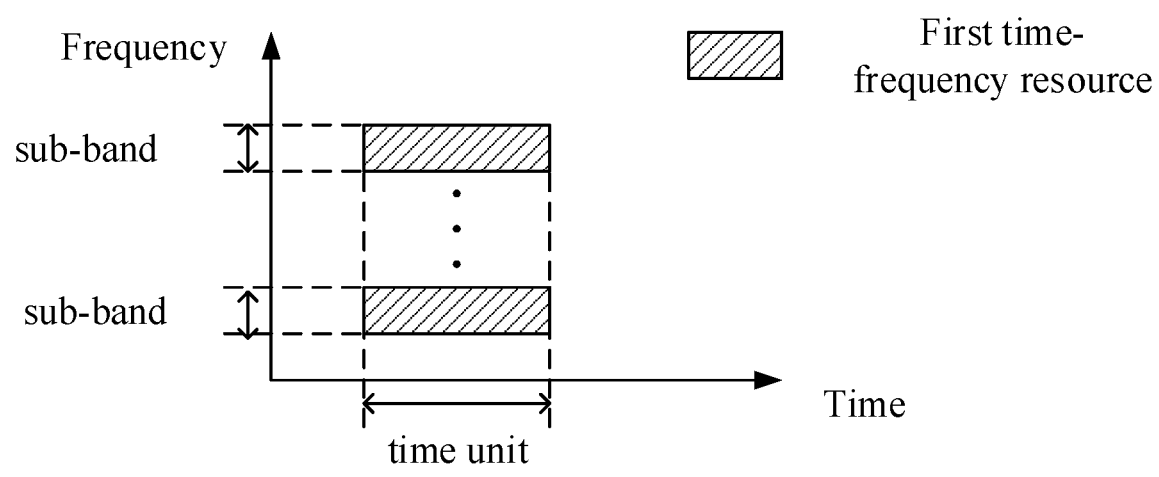
FIG. 11 illustrates a schematic diagram of a first time-frequency resource according to one embodiment of the present disclosure.

Embodiment 11 illustrates a schematic diagram of a first time-frequency resource, as shown in FIG. 11. In FIG. 11, a time-domain resource occupied by the first time-frequency resource belongs to the first time-domain resource of the present disclosure. The first time-domain resource occupies a time unit in time domain, and the first time-frequency resource occupies multiple sub-bands in frequency domain.

In one embodiment, the multiple sub-bands are discrete in frequency domain.

In one embodiment, a frequency bandwidth occupied by any one of the multiple sub-bands is a frequency bandwidth corresponding to a Physical Resource Block (PRB).

In one embodiment, the third radio signal in the present disclosure is transmitted in one of the multiple sub-bands.

In one embodiment, the fourth radio signal in the present disclosure is transmitted in one of the multiple sub-bands.

Embodiment 12

Figure 12:
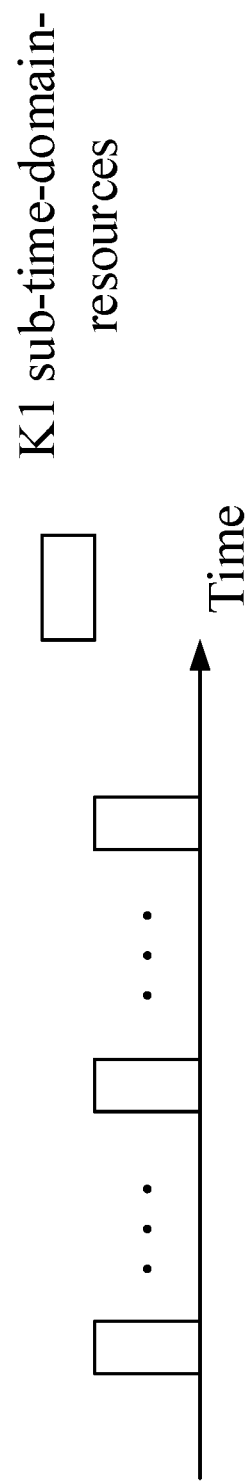
FIG. 12 illustrates a schematic diagram of a first time-domain resource according to one embodiment of the present disclosure.

Embodiment 12 illustrates a schematic diagram of a first time-domain resource, as shown in FIG. 12. In FIG. 12, the first time-domain resource comprises K1 sub-time-domain resources, and any of the K1 sub-time-domain resources occupies a time unit, K1 being a positive integer greater than 1.

In one embodiment, the K1 sub-time-domain resources are discrete in time domain.

In one embodiment, the third radio signal of the present disclosure is transmitted in one of the K1 sub-time-domain resources.

In one embodiment, the fourth radio signal of the present disclosure is transmitted in one of the K1 sub-time-domain resources.

In one embodiment, the phrase of the present disclosure that the second information indicates a first time-domain resource relative to a first instant of time means that the second information indicates an earliest one of the K1 sub-time-domain resources in time domain relative to a first instant of time.

Embodiment 13

Figure 13:
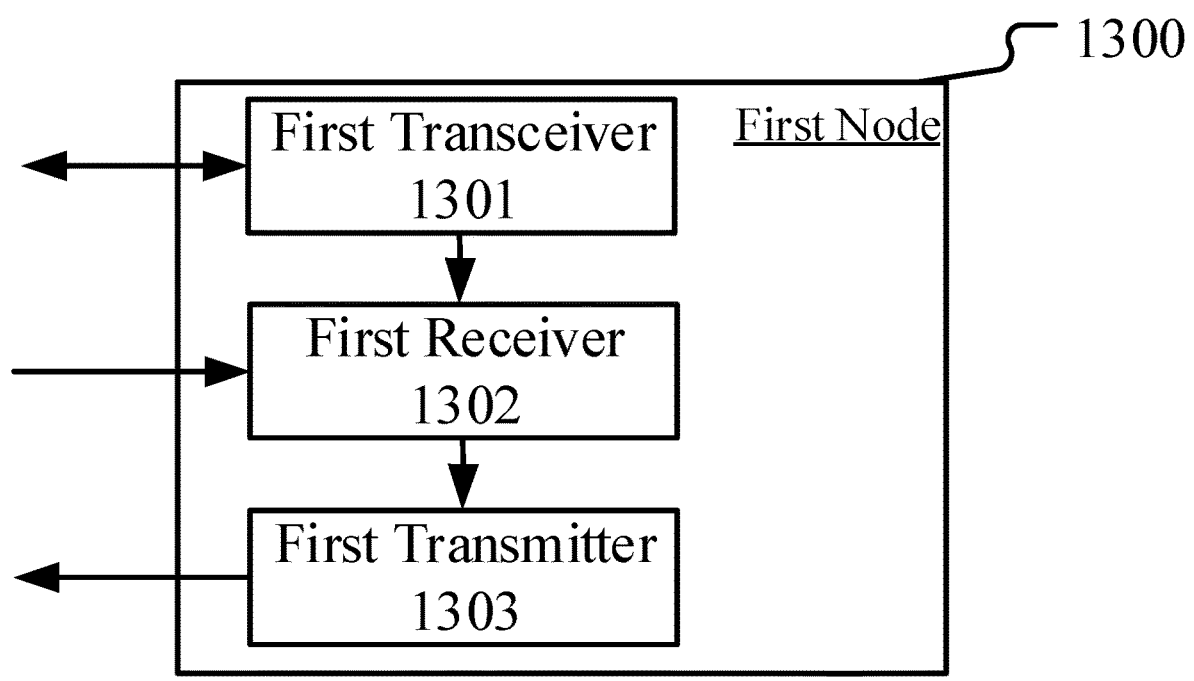
FIG. 13 illustrates a structure block diagram of a processing device in a first node according to one embodiment of the present disclosure.

Embodiment 13 illustrates a structure block diagram of a processing device in a first node, as shown in FIG. 13. In FIG. 13, a first node's processing device 1300 comprises a first transceiver 1301, a first receiver 1302 and a first transmitter 1303.

The first transceiver 1301 receives first information and second information via an air interface, wherein the first information indicates a first time offset value, and the second information indicates a first time-domain resource relative to a first instant of time;

the first receiver 1302 receives a second radio signal;

the first transmitter 1303 transmits a third radio signal.

In Embodiment 13, the first instant of time is associated with a first time unit, the first time unit is a time unit to which a first reception time belongs after being delayed by the first time offset value, and the first reception time is associated with a time-domain resource used for receiving the first information; a time-domain resource used for receiving the second radio signal is associated with a time-domain resource used for receiving the first information, the second information is used for determining a time-domain resource occupied by the third radio signal, and the third radio signal indicates whether the second radio signal is correctly decoded.

In one embodiment, the first transceiver 1301 also transmits a first radio signal; the first radio signal is used for determining a time-unit-level synchronous timing, and a synchronous timing of the first time unit is in conformity with the time-unit-level synchronous timing.

In one embodiment, the first transceiver 1301 also receives a first signaling, the first signaling comprising the first information and the second information; the first signaling comprises configuration information of the second radio signal, the configuration information of the second radio signal comprising the time-domain resource used for receiving the second radio signal.

In one embodiment, the first time offset value is related to a subcarrier spacing employed by the second radio signal, or the first time offset value is related to a subcarrier spacing employed by a radio signal occupied by the first information.

In one embodiment, the first transceiver 1301 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the first receiver 1302 comprises at least the first four of the antenna 452, the receiver 454, the multi-antenna receiving processor 458, the receiving processor 456 and the controller/processor 459 in Embodiment 4.

In one embodiment, the first transmitter 1303 comprises at least the first four of the antenna 452, the transmitter 454, the multi-antenna transmitting processor 457, the transmitting processor 468 and the controller/processor 459 in Embodiment 4.

Embodiment 14

Figure 14:
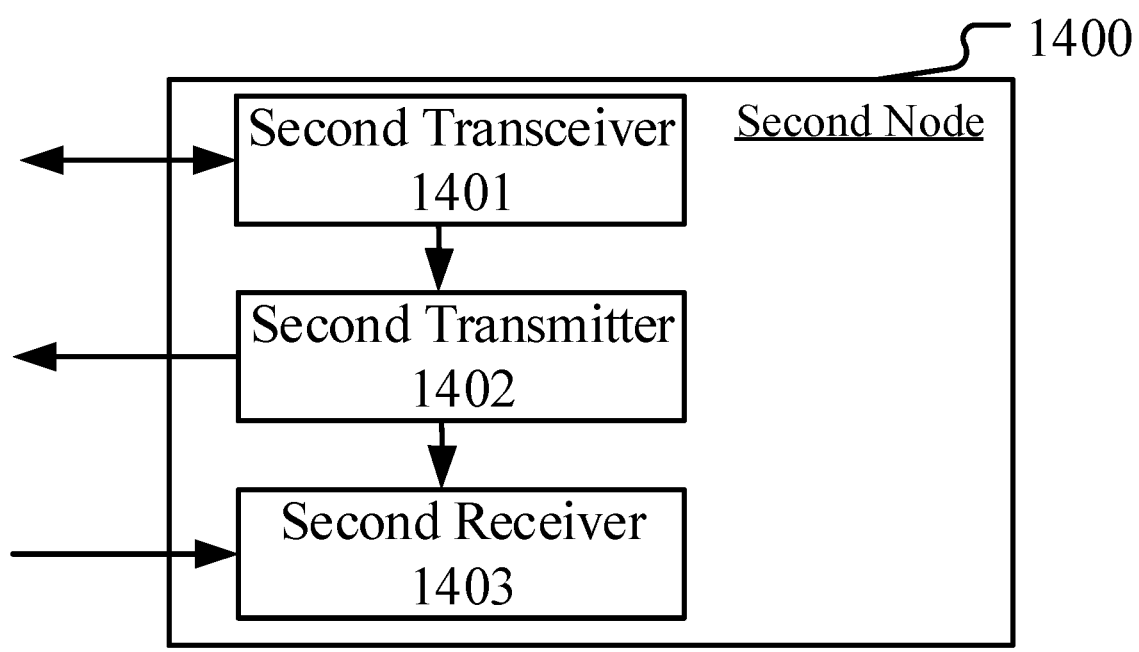
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, a second node's processing device 1400 comprises a second transceiver 1401, a second transmitter 1402 and a second receiver 1403.

The second transceiver 1401 transmits first information and second information via an air interface, the first information indicating a first time offset value, and the second information indicating a first time-domain resource relative to a first instant of time;

the second transmitter 1402 transmits a second radio signal;

the second receiver 1403 receives a third radio signal.

In Embodiment 14, the first instant of time is associated with a first time unit, the first time unit is a time unit to which a first reception time belongs after being delayed by the first time offset value, and the first reception time is associated with a time-domain resource used for receiving the first information; a time-domain resource used for receiving the second radio signal is associated with a time-domain resource used for receiving the first information, the second information is used for determining a time-domain resource occupied by the third radio signal, and the third radio signal indicates whether the second radio signal is correctly decoded.

In one embodiment, the second transceiver 1401 also receives a first radio signal; the first radio signal is used for determining a time-unit-level synchronous timing, and a synchronous timing of the first time unit is in conformity with the time-unit-level synchronous timing.

In one embodiment, the second transceiver 1401 also transmits a first signaling, the first signaling comprising the first information and the second information; the first signaling comprises configuration information of the second radio signal, the configuration information of the second radio signal comprising the time-domain resource used for receiving the second radio signal.

In one embodiment, the first time offset value is related to a subcarrier spacing employed by the second radio signal, or the first time offset value is related to a subcarrier spacing employed by a radio signal occupied by the first information.

In one embodiment, the second transceiver 1401 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the second transmitter 1402 comprises at least the first four of the antenna 420, the transmitter 418, the multi-antenna transmitting processor 471, the transmitting processor 416 and the controller/processor 475 in Embodiment 4.

In one embodiment, the second receiver 1403 comprises at least the first four of the antenna 420, the receiver 418, the multi-antenna receiving processor 472, the receiving processor 470 and the controller/processor 475 in Embodiment 4.

Embodiment 15

Figure 15:
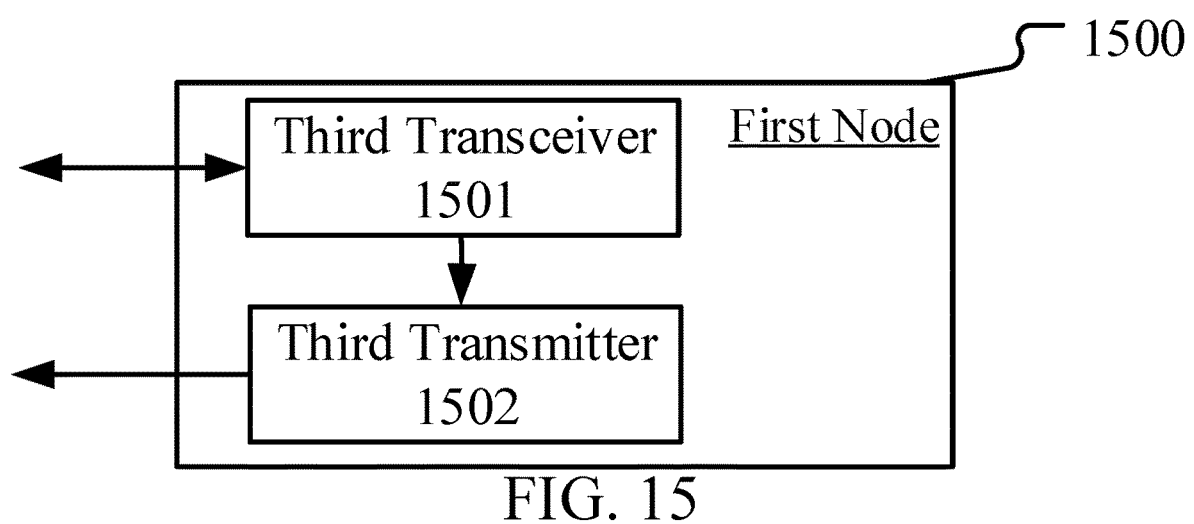
FIG. 15 illustrates a structure block diagram of a processing device in a first node according to another embodiment of the present disclosure.

Embodiment 15 illustrates another structure block diagram of a processing device in a first node, as shown in FIG. 15. In FIG. 15, a first node's processing device 1500 comprises a third transceiver 1501 and a third transmitter 1502.

The third transceiver 1501 receives first information and second information via an air interface, wherein the first information indicates a first time offset value, and the second information indicates a first time-domain resource relative to a first instant of time;

the third transmitter 1502 transmits a fourth radio signal.

In Embodiment 15, the first instant of time is associated with a first time unit, the first time unit is a time unit to which a first reception time belongs after being delayed by the first time offset value, and the first reception time is associated with a time-domain resource used for receiving the first information; the second information is used for determining a time-domain resource occupied by the fourth radio signal, and the time-domain resource occupied by the fourth radio signal is associated with the first time-domain resource.

In one embodiment, the third transceiver 1501 also transmits a first radio signal; the first radio signal is used for determining a time-unit-level synchronous timing, and a synchronous timing of the first time unit is in conformity with the time-unit-level synchronous timing.

In one embodiment, the third transceiver 1501 also receives a first signaling, the first signaling comprising the first information and the second information; the first signaling comprises configuration information of the fourth radio signal, the configuration information of the fourth radio signal comprising the time-domain resource used for transmitting the fourth radio signal.

In one embodiment, the first time offset value is related to a subcarrier spacing employed by a radio signal occupied by the first information.

In one embodiment, the third transceiver 1501 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the third transmitter 1502 comprises at least the first four of the antenna 452, the transmitter 454, the multi-antenna transmitting processor 457, the transmitting processor 468 and the controller/processor 459 in Embodiment 4.

Embodiment 16

Figure 16:
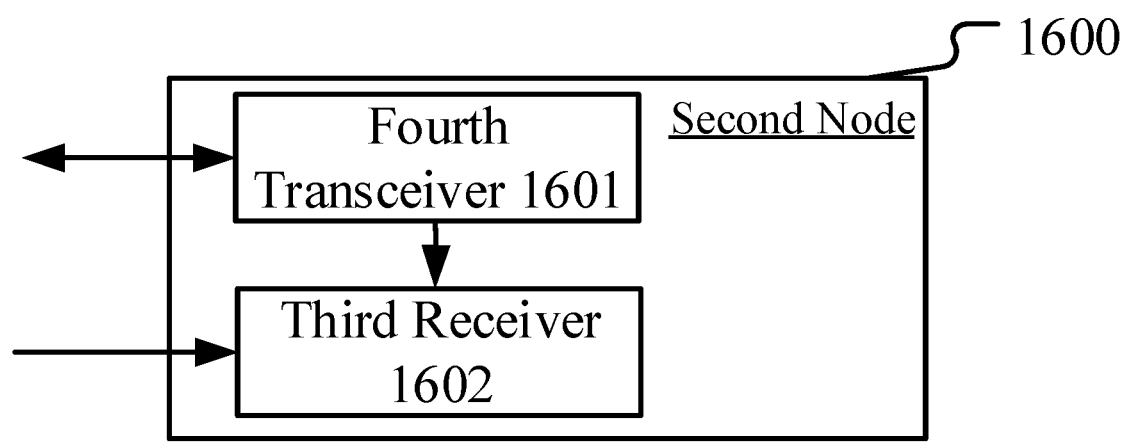
FIG. 16 illustrates a structure block diagram of a processing device in a second node according to another embodiment of the present disclosure.

Embodiment 16 illustrates another structure block diagram of a processing device in a second node, as shown in FIG. 16. In FIG. 16, a second node's processing device 1600 comprises a fourth transceiver 1601 and a third receiver 1602.

The fourth transceiver 1601 transmits first information and second information via an air interface, the first information indicating a first time offset value, and the second information indicating a first time-domain resource relative to a first instant of time;

the third receiver 1602 receives a fourth radio signal.

In Embodiment 16, the first instant of time is associated with a first time unit, the first time unit is a time unit to which a first reception time belongs after being delayed by the first time offset value, and the first reception time is associated with a time-domain resource used for receiving the first information; the second information is used for determining a time-domain resource occupied by the fourth radio signal, and the time-domain resource occupied by the fourth radio signal is associated with the first time-domain resource.

In one embodiment, the fourth transceiver 1601 also receives a first radio signal; the first radio signal is used for determining a time-unit-level synchronous timing, and a synchronous timing of the first time unit is in conformity with the time-unit-level synchronous timing.

In one embodiment, the fourth transceiver 1601 also transmits a first signaling, the first signaling comprising the first information and the second information; the first signaling comprises configuration information of the fourth radio signal, the configuration information of the fourth radio signal comprising the time-domain resource used for transmitting the fourth radio signal.

In one embodiment, the first time offset value is related to a subcarrier spacing employed by a radio signal occupied by the first information.

In one embodiment, the fourth transceiver 1601 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the third receiver 1602 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced Machine Type Communication (eMTC) terminals, NB-IOT terminals, vehicle-mounted communication equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
   receiving first information and second information via an air interface, the first information indicating a first time offset value, and the second information indicating a first time-domain resource relative to a first instant of time; wherein:
   the first instant of time is associated with a first time unit, the first time unit is a time unit to which a first reception time belongs after being delayed by the first time offset value, and the first reception time is associated with a time-domain resource used for receiving the first information;
   the first time offset value does not exceed a duration of a time unit;
   the time unit refers to sub-frame or slot;
   the first time offset value corresponds to a time duration of a positive integer number of multicarrier symbol;
   a second node is the transmitter of the first information;
   the first time offset value is related to a transmission delay between the first node and the second node, or the first time offset value is related to a timing difference between the first node and the second node, or the first time offset value is related to both a transmission delay and a timing difference between the first node and the second node;
   the first reception time is an end time or a start time for a multicarrier symbol occupied by the first information at the first node side;
   the first instant of time is a start of the first time unit, or the first instant of time is an end of the first time unit, or the first instant of time is a start of a Q1-th time unit following the first time unit, or the first instant of time is an end of a Q1-th time unit following the first time unit, Q1 being a positive integer;
   a start time for the first time unit is determined according to a transmission timing of the first node;
   the first information and the second information are respectively two fields of Sidelink Control Information (SCI); and
   the Q1 is indicated by the second information.

2. The method according to claim 1, comprising:
   transmitting a first radio signal;
   wherein the first radio signal is used for determining a time-unit-level synchronous timing, and a synchronous timing of the first time unit is in conformity with the time-unit-level synchronous timing.

3. The method according to claim 1, comprising:
   receiving a second radio signal; and
   transmitting a third radio signal;
   wherein a time-domain resource used for receiving the second radio signal is associated with a time-domain resource used for receiving the first information, the second information is used for determining a time-domain resource occupied by the third radio signal, and the third radio signal indicates whether the second radio signal is correctly decoded;
   or, comprising:
   transmitting a fourth radio signal;
   wherein the second information is used for determining a time-domain resource occupied by the fourth radio signal, and the time-domain resource occupied by the fourth radio signal is associated with the first time-domain resource.

4. The method according to claim 3, comprising:
   receiving a first signaling, the first signaling comprising the first information and the second information;
   wherein the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

5. The method according to claim 1, wherein the first time offset value is related to a subcarrier spacing employed by the second radio signal, or the first time offset value is related to a subcarrier spacing employed by a radio signal occupied by the first information.

6. A method in a second node for wireless communications, comprising:
   transmitting first information and second information via an air interface, the first information indicating a first time offset value, and the second information indicating a first time-domain resource relative to a first instant of time; wherein:

the first instant of time is associated with a first time unit;

the first time unit is a time unit to which a first reception time belongs after being delayed by the first time offset value;

the first reception time is associated with a time-domain resource used for receiving the first information;

the first time offset value does not exceed a duration of a time unit;

the time unit refers to sub-frame or slot;

the first time offset value corresponds to a time duration of a positive integer number of multicarrier symbol;

a first node is the receiver of the first information;

the first time offset value is related to a transmission delay between the first node and the second node, or the first time offset value is related to a timing difference between the first node and the second node, or the first time offset value is related to both a transmission delay and a timing difference between the first node and the second node;

the first reception time is an end time or a start time for a multicarrier symbol occupied by the first information at the first node side;

the first instant of time is a start of the first time unit, or the first instant of time is an end of the first time unit, or the first instant of time is a start of a Q1-th time unit following the first time unit, or the first instant of time is an end of a Q1-th time unit following the first time unit, Q1 being a positive integer;

a start time for the first time unit is determined according to a transmission timing of the first node;

the first information and the second information are respectively two fields of Sidelink Control Information (SCI); and the Q1 is indicated by the second information.

7. The method according to claim 6, comprising:
receiving a first radio signal;
wherein the first radio signal is used for determining a time-unit-level synchronous timing, and a synchronous timing of the first time unit is in conformity with the time-unit-level synchronous timing.

8. The method according to claim 6, comprising:
transmitting a second radio signal; and
receiving a third radio signal;
wherein a time-domain resource used for receiving the second radio signal is associated with a time-domain resource used for receiving the first information, the second information is used for determining a time-domain resource occupied by the third radio signal, and the third radio signal indicates whether the second radio signal is correctly decoded;
or, comprising:
receiving a fourth radio signal;
wherein the second information is used for determining a time-domain resource occupied by the fourth radio signal, and the time-domain resource occupied by the fourth radio signal is associated with the first time-domain resource.

9. The method according to claim 8, comprising:
transmitting a first signaling, the first signaling comprising the first information and the second information;
wherein the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

10. The method according to claim 6, wherein the first time offset value is related to a subcarrier spacing employed by the second radio signal, or the first time offset value is related to a subcarrier spacing employed by a radio signal occupied by the first information.

11. A first node for wireless communications, comprising:
a first transceiver, which receives first information and second information via an air interface, the first information indicating a first time offset value, and the second information indicating a first time-domain resource relative to a first instant of time; wherein:

the first instant of time is associated with a first time unit;

the first time unit is a time unit to which a first reception time belongs after being delayed by the first time offset value;

the first reception time is associated with a time-domain resource used for receiving the first information;

the first time offset value does not exceed a duration of a time unit;

the time unit refers to sub-frame or slot;

the first time offset value corresponds to a time duration of a positive integer number of multicarrier symbol;

a second node is the transmitter of the first information;

the first time offset value is related to a transmission delay between the first node and the second node, or the first time offset value is related to a timing difference between the first node and the second node, or the first time offset value is related to both a transmission delay and a timing difference between the first node and the second node;

the first reception time is an end time or a start time for a multicarrier symbol occupied by the first information at the first node side;

the first instant of time is a start of the first time unit, or the first instant of time is an end of the first time unit, or the first instant of time is a start of a Q1-th time unit following the first time unit, or the first instant of time is an end of a Q1-th time unit following the first time unit, Q1 being a positive integer;

a start time for the first time unit is determined according to a transmission timing of the first node;

the first information and the second information are respectively two fields of Sidelink Control Information (SCI); and the Q1 is indicated by the second information.

12. The first node according to claim 11, wherein the first transceiver transmits a first radio signal; the first radio signal is used for determining a time-unit-level synchronous timing, and a synchronous timing of the first time unit is in conformity with the time-unit-level synchronous timing.

13. The first node according to claim 11, comprising:
a first receiver, which receives a second radio signal; and
a first transmitter, which transmits a third radio signal;
wherein a time-domain resource used for receiving the second radio signal is associated with a time-domain resource used for receiving the first information, the second information is used for determining a time-domain resource occupied by the third radio signal, and the third radio signal indicates whether the second radio signal is correctly decoded;
or, comprising:
a third transmitter, which transmits a fourth radio signal;

wherein the second information is used for determining a time-domain resource occupied by the fourth radio signal, and the time-domain resource occupied by the fourth radio signal is associated with the first time-domain resource.

14. The first node according to claim 13, wherein the first transceiver receives a first signaling, the first signaling comprising the first information and the second information; the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

15. The first node according to claim 11, wherein the first time offset value is related to a subcarrier spacing employed by the second radio signal, or the first time offset value is related to a subcarrier spacing employed by a radio signal occupied by the first information.

16. A second node for wireless communications, comprising:
a second transceiver, which transmits first information and second information via an air interface, the first information indicating a first time offset value, and the second information indicating a first time-domain resource relative to a first instant of time; wherein:
the first instant of time is associated with a first time unit;
the first time unit is a time unit to which a first reception time belongs after being delayed by the first time offset value;
the first reception time is associated with a time-domain resource used for receiving the first information;
the first time offset value does not exceed a duration of a time unit;
the time unit refers to sub-frame or slot;
the first time offset value corresponds to a time duration of a positive integer number of multicarrier symbol;
a first node is the receiver of the first information;
the first time offset value is related to a transmission delay between the first node and the second node, or the first time offset value is related to a timing difference between the first node and the second node, or the first time offset value is related to both a transmission delay and a timing difference between the first node and the second node;
the first reception time is an end time or a start time for a multicarrier symbol occupied by the first information at the first node side;
the first instant of time is a start of the first time unit, or the first instant of time is an end of the first time unit, or the first instant of time is a start of a Q1-th time unit following the first time unit, or the first instant of time is an end of a Q1-th time unit following the first time unit, Q1 being a positive integer;
a start time for the first time unit is determined according to a transmission timing of the first node;
the first information and the second information are respectively two fields of Sidelink Control Information (SCI); and
the Q1 is indicated by the second information.

17. The second node according to claim 16, wherein the second transceiver receives a first radio signal; the first radio signal is used for determining a time-unit-level synchronous timing, and a synchronous timing of the first time unit is in conformity with the time-unit-level synchronous timing.

18. The second node according to claim 16, comprising:
a second transmitter, which transmits a second radio signal; and
a second receiver, which receives a third radio signal;
wherein a time-domain resource used for receiving the second radio signal is associated with a time-domain resource used for receiving the first information, the second information is used for determining a time-domain resource occupied by the third radio signal, and the third radio signal indicates whether the second radio signal is correctly decoded;
or, comprising:
a third receiver, which receives a fourth radio signal;
wherein the second information is used for determining a time-domain resource occupied by the fourth radio signal, and the time-domain resource occupied by the fourth radio signal is associated with the first time-domain resource.

19. The second node according to claim 18, wherein the second transceiver transmits a first signaling, the first signaling comprising the first information and the second information; the first signaling comprises configuration information of the second radio signal, the configuration information of the second radio signal comprising the time-domain resource used for receiving the second radio signal; or the first signaling comprises configuration information of the fourth radio signal, the configuration information of the fourth radio signal comprising a time-domain resource used for transmitting the fourth radio signal.

20. The second node according to claim 16, wherein the first time offset value is related to a subcarrier spacing employed by the second radio signal, or the first time offset value is related to a subcarrier spacing employed by a radio signal occupied by the first information.

* * * * *